United States Patent
Kimura et al.

(10) Patent No.: US 10,893,161 B2
(45) Date of Patent: Jan. 12, 2021

(54) PRINTING SYSTEM OPERABLE FROM PLURALITY OF APPLICATIONS, INFORMATION PROCESSING APPARATUS, AND METHOD AND PROGRAM FOR CONTROLLING INFORMATION PROCESSING APPARATUS

(71) Applicant: CANON KABUSHIKI KAISHA, Tokyo (JP)

(72) Inventors: Yusuke Kimura, Abiko (JP); Nobuhiro Kawamura, Nagareyama (JP); Hiroya Igarashi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/513,542

(22) Filed: Jul. 16, 2019

(65) Prior Publication Data
US 2020/0036849 A1    Jan. 30, 2020

(30) Foreign Application Priority Data

Jul. 26, 2018    (JP) .................................. 2018-140395

(51) Int. Cl.
*H04N 1/00* (2006.01)
*G06K 15/12* (2006.01)
*G06F 3/12* (2006.01)

(52) U.S. Cl.
CPC ....... *H04N 1/00779* (2013.01); *G06F 3/1239* (2013.01); *G06F 3/1256* (2013.01);
(Continued)

(58) Field of Classification Search
CPC ........... H04N 1/00779; H04N 1/00129; H04N 1/00421; G06F 3/1239; G06F 3/1256;
(Continued)

(56) References Cited

U.S. PATENT DOCUMENTS

2014/0320903 A1* 10/2014 Kyoo .................... G06F 3/1239
                                                                    358/1.15
2015/0138582 A1*  5/2015 Ito ...................... H04N 1/00925
                                                                    358/1.13
(Continued)

FOREIGN PATENT DOCUMENTS

CN            1623137 A       6/2005
CN         105172394 A      12/2015
(Continued)

*Primary Examiner* — Iriana Cruz
(74) *Attorney, Agent, or Firm* — Canon U.S.A., Inc. I.P. Division

(57) ABSTRACT

A printing system includes a printing apparatus provided with sheet containers and capable of registering sheet information in correspondence with the sheet containers. The printing apparatus can update print adjustment information linked with the sheet information in accordance with a request from a sheet management application executed by an external apparatus. The printing apparatus includes a unit configured to retain information about the external apparatus executing the sheet management application. The unit is configured to simultaneously retain information about multiple external apparatuses. The external apparatus includes a display configured to display information and a unit configured to cause the display to display an execution screen of the sheet management application. The execution screen can list the sheet information registered in correspondence with the plurality of sheet containers and includes a message indicating that the sheet management application should not be executed simultaneously by a plurality of external terminals.

13 Claims, 28 Drawing Sheets

⟨1700

MediaLibrarian

UNABLE TO CONNECT TO PRINTER.

CHECK WHETHER ANOTHER USER IS CONNECTED TO PRINTER.

APPLICATION WILL TERMINATE.

| OK |

1701

(52) U.S. Cl.
CPC .......... *G06F 3/1258* (2013.01); *G06F 3/1263* (2013.01); *G06F 3/1286* (2013.01); *G06K 15/12* (2013.01); *H04N 1/00129* (2013.01); *H04N 1/00421* (2013.01)

(58) Field of Classification Search
CPC .... G06F 3/1258; G06F 3/1263; G06F 3/1286; G06K 15/12; G06K 15/16; G06K 15/002; G06K 15/4065
See application file for complete search history.

(56) References Cited

U.S. PATENT DOCUMENTS

| | | | |
|---|---|---|---|
| 2015/0160902 A1* | 6/2015 | Tsujita | G06F 3/1288 358/1.6 |
| 2018/0152572 A1* | 5/2018 | Yano | H04N 1/00435 |

FOREIGN PATENT DOCUMENTS

| | | | |
|---|---|---|---|
| CN | 107710145 | A | 2/2018 |
| CN | 108124072 | A | 6/2018 |
| JP | 2000-181669 | A | 6/2000 |
| JP | 2003-318904 | A | 11/2003 |
| JP | 2004-295250 | A | 10/2004 |
| JP | 2007-042065 | A | 2/2007 |
| JP | 2017-111602 | A | 6/2017 |
| JP | 2018-86766 | A | 6/2018 |
| JP | 2018-109833 | A | 7/2018 |

* cited by examiner

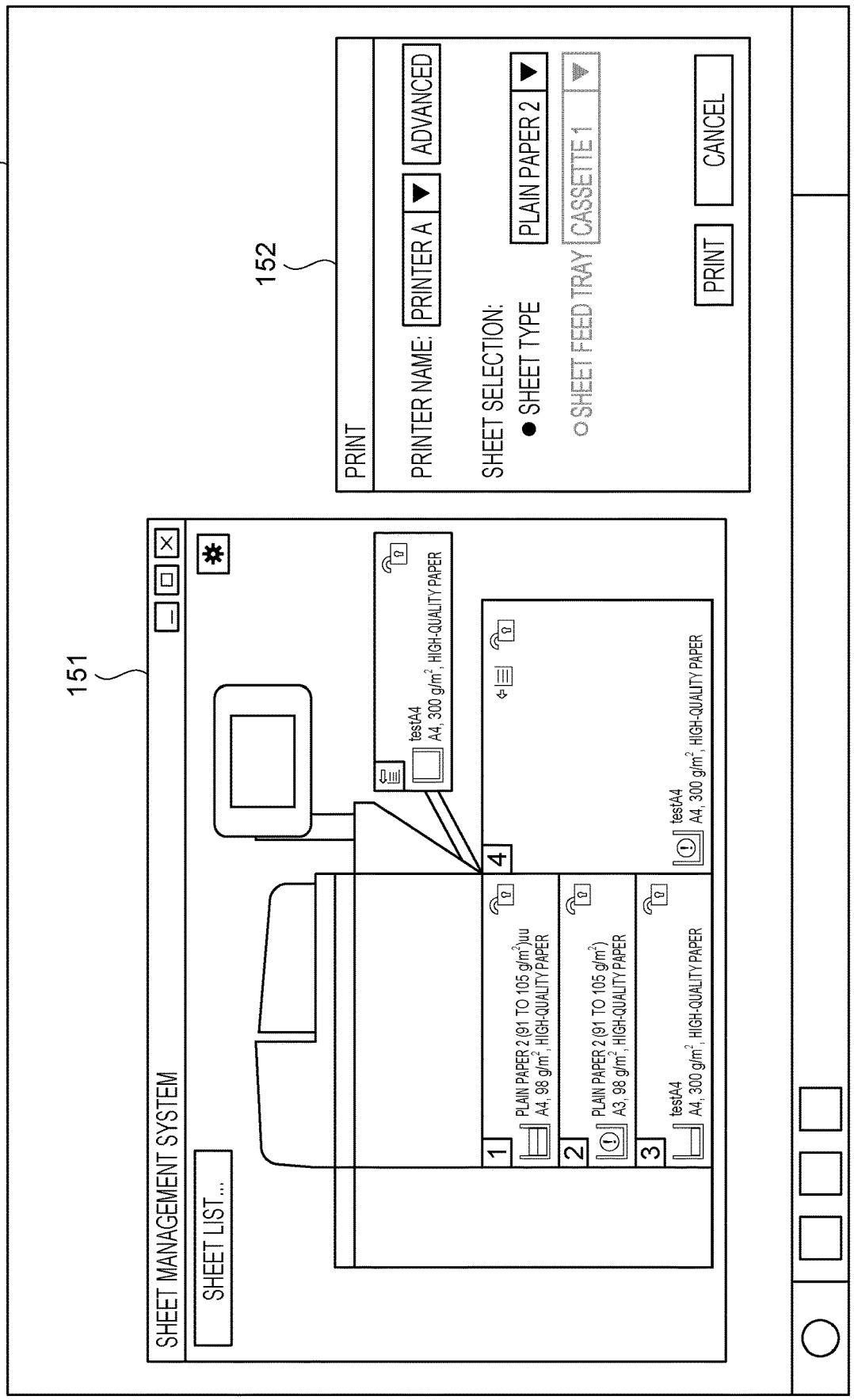

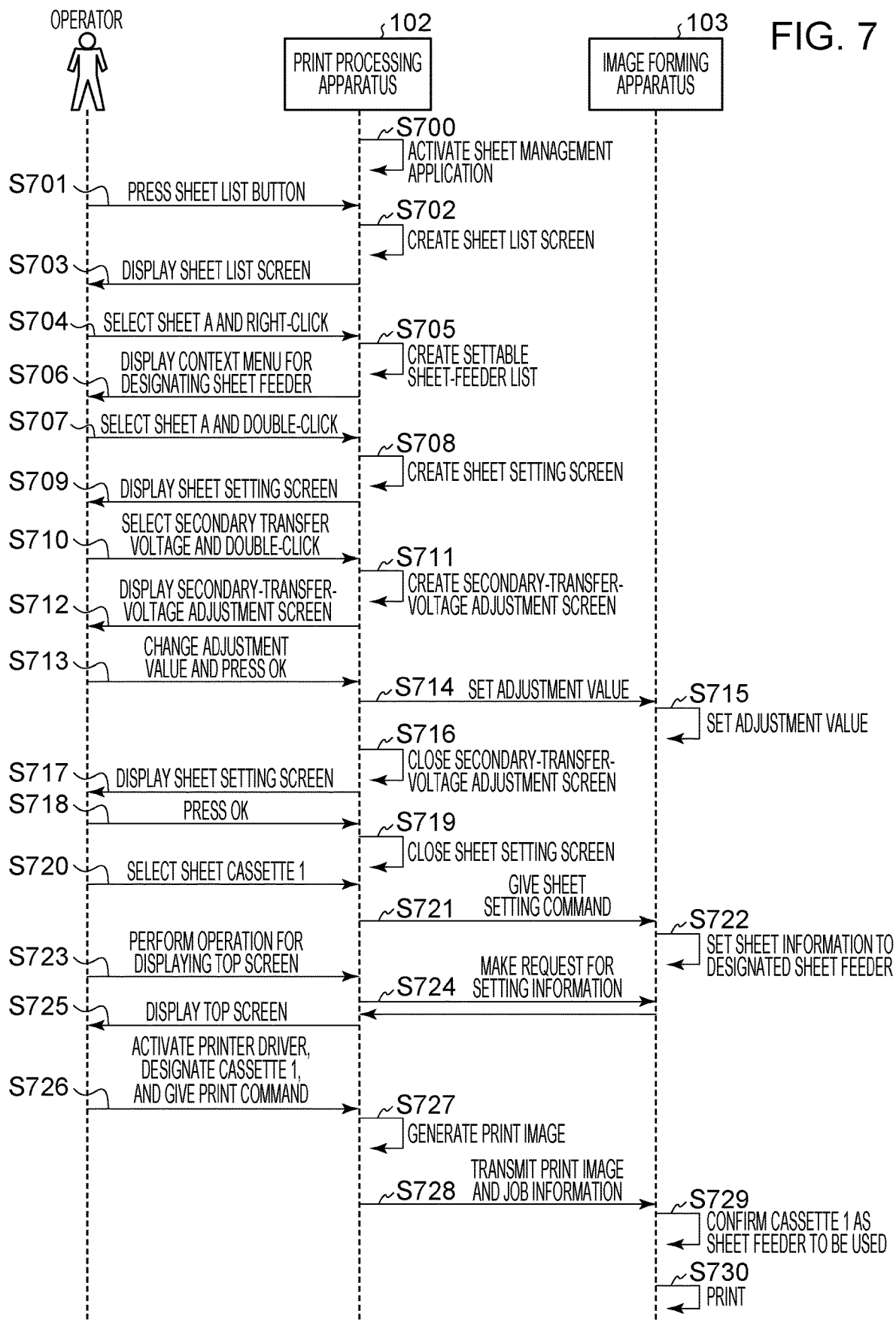

FIG. 8B

NEW REGISTRATION/EDITING — 850

*NAME:
CLIENT A_TEXT SHEET 1

*BASIS WEIGHT: 100 g/m²    COLOR: WHITE

*SURFACE PROPERTY:
HIGH-QUALITY PAPER

*SIZE: A4
X: mm  INCHES  (148.0 TO 762.0)
Y: mm  (100.0 TO 330.2)

CHARACTERISTICS:
NONE

FLAP POSITION OF ENVELOPE:

SECOND FACE FOR DUPLEX PRINTING:
◉ NOT SET
○ SET

FAVORITES:
☐ ① CLIENT A
☐ ② CLIENT B
☐ ③ CLIENT C

[REGISTER/EDIT...]

* INDICATES REQUIRED ITEMS.

ADJUSTMENT: — 851, 852, 853

DISPLAY GROUP: ALL

| ADJUSTMENT ITEM | ADJUSTMENT/NO ADJUSTMENT | DISPLAY GROUP |
|---|---|---|
| GLOSSINESS/BLACK-QUALITY ADJUSTMENT | NOT SET | IMAGE QUALITY |
| SECONDARY-TRANSFER-VOLTAGE ADJUSTMENT | NOT SET | IMAGE QUALITY |
| TRAILING-EDGE WHITE-VOID CORRECTION | NOT SET | IMAGE QUALITY |
| SECONDARY-TRANSFER-CHANGE-REMOVAL-BIAS ADJUSTMENT | NOT SET | IMAGE QUALITY |
| ITB IMAGE-REMOVAL ADJUSTMENT | NOT SET | IMAGE QUALITY |
| TONER-AMOUNT ADJUSTMENT MODE | NOT SET | IMAGE QUALITY |
| PRIMARY-TRANSFER-VOLTAGE ADJUSTMENT | NOT SET | IMAGE QUALITY |
| REGISTRATION-LOOP ADJUSTMENT | NOT SET | IMAGE QUALITY |
| REGISTRATION-SPEED ADJUSTMENT | NOT SET | IMAGE QUALITY |
| IMAGE-SCRAPING CORRECTION | NOT SET | IMAGE QUALITY |
| FIXATION-PRESSURE ADJUSTMENT | NOT SET | IMAGE QUALITY |
| FIXATION-SPEED ADJUSTMENT | NOT SET | IMAGE QUALITY |
| IMAGE-POSITION ADJUSTMENT | NOT SET | IMAGE POSITION |
| LEADING-EDGE/TRAILING-EDGE MARGIN ADJUSTMENT | NOT SET | IMAGE POSITION |
| AUTOMATIC LATERAL-REGISTRATION ADJUSTMENT | NOT SET | IMAGE POSITION |
| SHEET-SEPARATING-FAN AIR-VOLUME ADJUSTMENT | NOT SET | SHEET CONVEYANCE |

854 — [OK]    855 — [CANCEL]

| SHEET NAME | SHEET ID | FAVORITES ID | USAGE HISTORY | SIZE | BASIS WEIGHT | CORRECTION LEVEL FOR GLOSSINESS/ BLACK-QUALITY (FRONT FACE) | CORRECTION LEVEL FOR GLOSSINESS/ BLACK-QUALITY (REAR FACE) | SETTABLE SHEET-FEEDER ID |
|---|---|---|---|---|---|---|---|---|
| SHEET A | 1 | NOT SET | 123 | A4 | 75 | 0 | 0 | 1,2,3,4,5 |
| SHEET B | 2 | NOT SET | 111 | A4 | 200 | 0 | 0 | 1,2,3,4,5 |
| SHEET C | 3 | NOT SET | 50 | A4 | 100 | 0 | 0 | 1,2,3,4,5 |
| SHEET D | 4 | NOT SET | 11 | A4 | 300 | 0 | 0 | 4,5 |
| SHEET E | 5 | NOT SET | 21 | A4 | 100 | 0 | 0 | 1,2,3,4,5 |
| ... | ... | ... | ... | ... | ... | ... | ... | ... |

| SHEET-FEEDER NAME | SHEET-FEEDER ID | SHEET ID | REMAINING NUMBER OF SHEETS |
|---|---|---|---|
| SHEET CASSETTE 1 | 1 | 1 | 25 |
| SHEET CASSETTE 2 | 2 | 3 | 25 |
| SHEET CASSETTE 3 | 3 | 5 | 25 |
| SHEET CASSETTE 4 | 4 | 3 | 25 |
| MANUAL FEED TRAY | 5 | 4 | 100 |
| ... | ... | ... | ... |

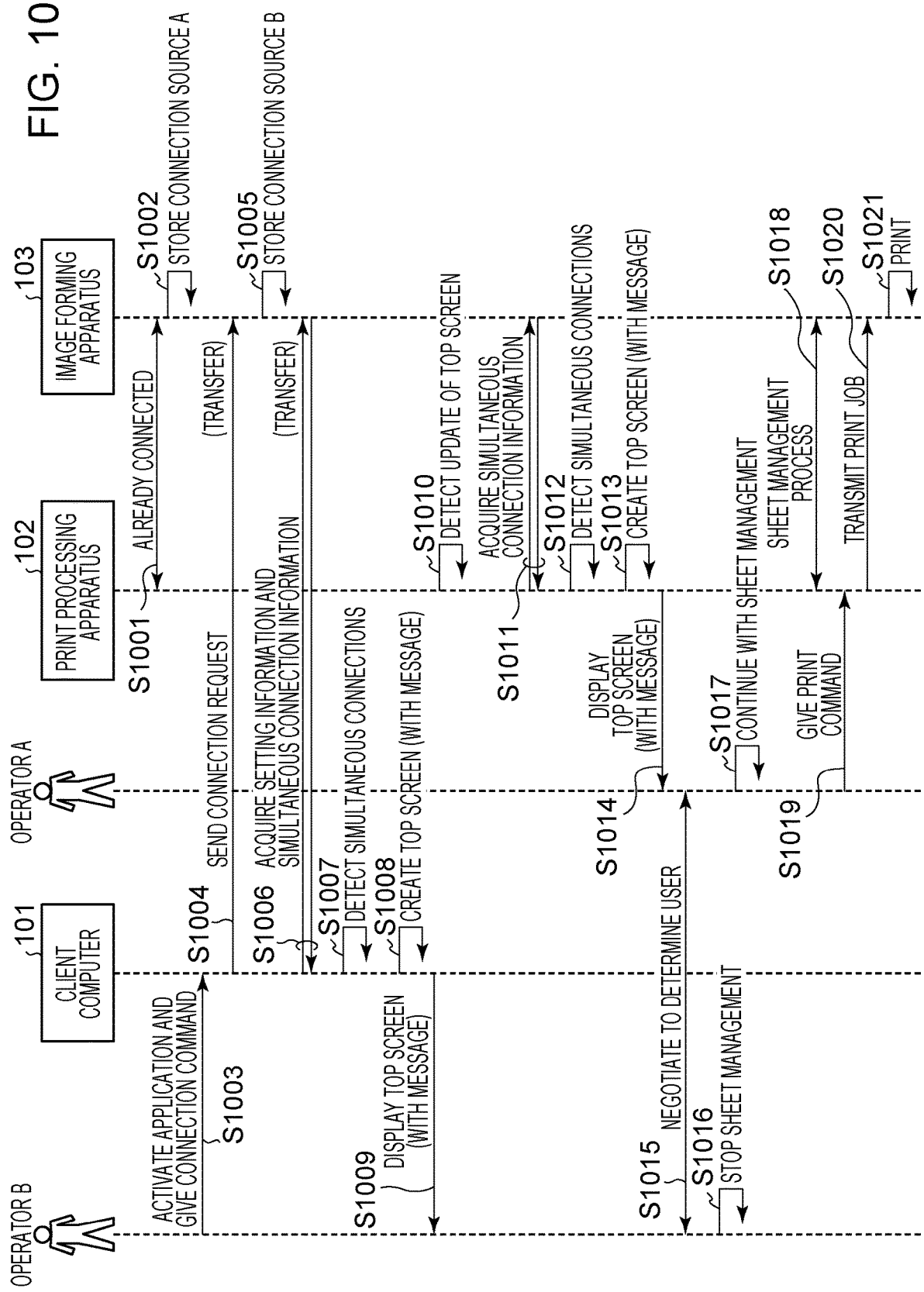

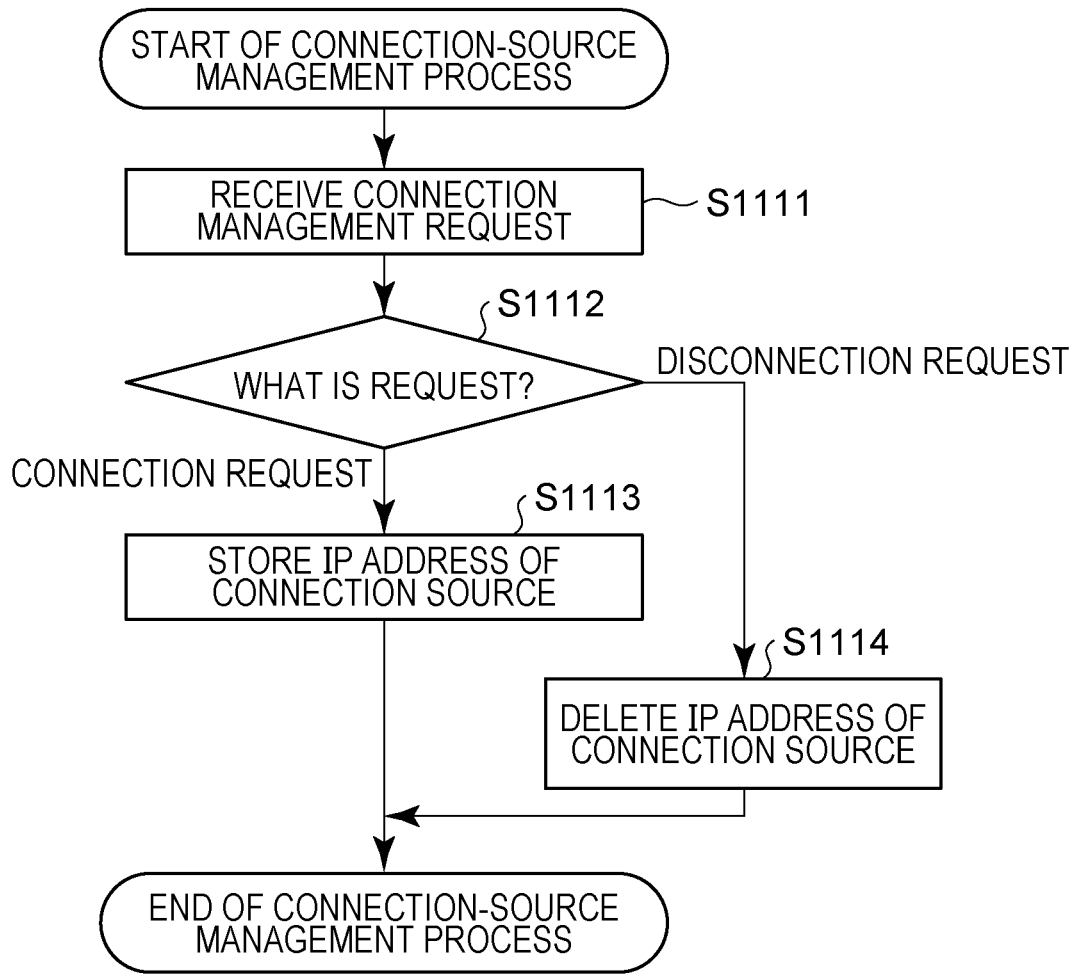

|   | IP ADDRESS OF CONNECTION SOURCE |
|---|---|
| 1 | 192.168.0.3 |
|   |   |
|   |   |
|   |   |

|   | IP ADDRESS OF CONNECTION SOURCE |
|---|---|
| 1 | 192.168.0.3 |
| 2 | 192.168.0.1 |
|   |   |
|   |   |

|   | IP ADDRESS OF CONNECTION SOURCE |
|---|---|
| 1 | 192.168.0.1 |
|   |   |
|   |   |
|   |   |

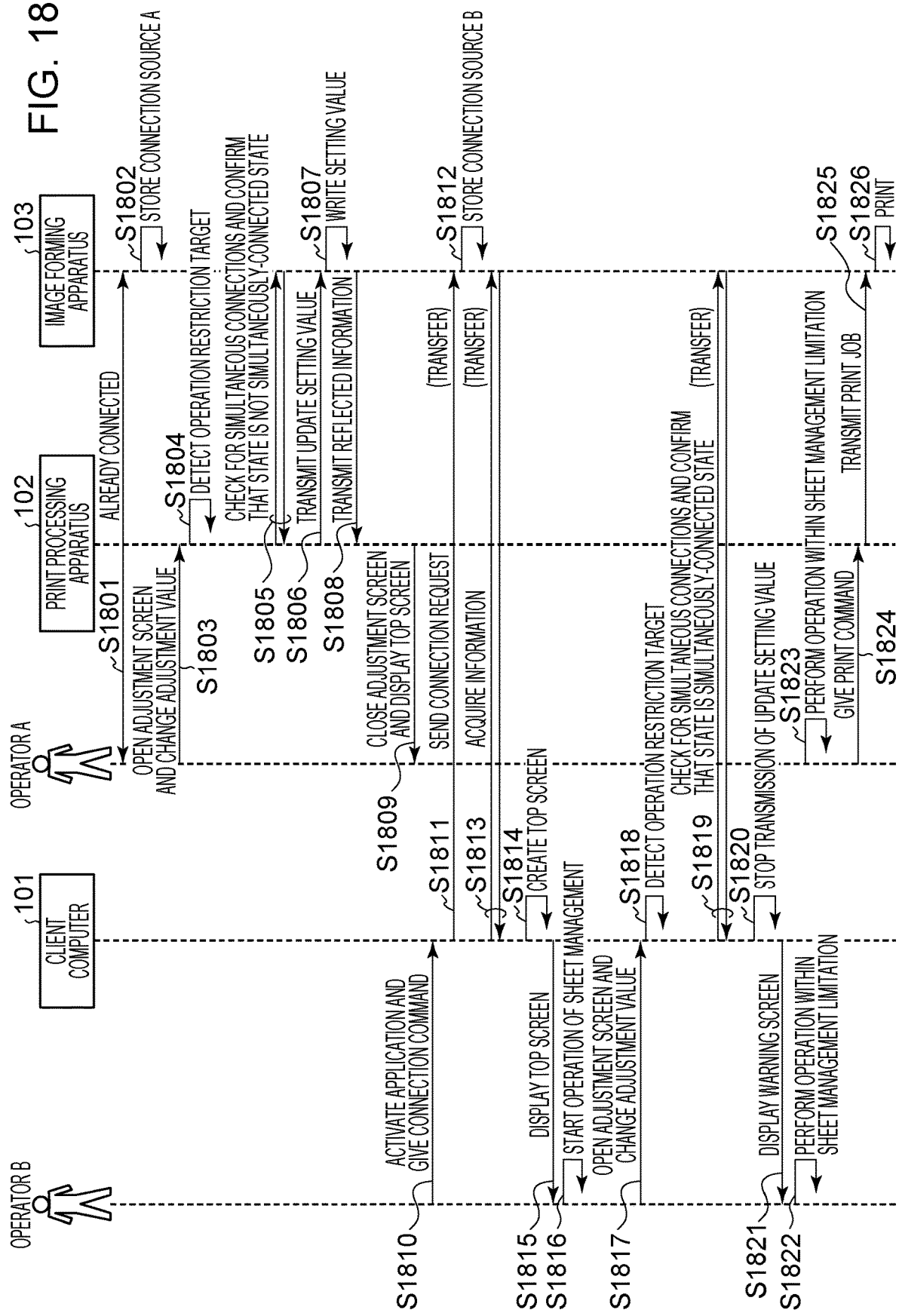

1910

| OPERATION | OPERATION TYPE ID | RESTRICTION |
|---|---|---|
| SHEET CREATION | 1 | NO |
| CHANGE OF SHEET SETTINGS | 2 | YES |
| CONFIRMATION OF SHEET SETTINGS | 3 | NO |
| SHEET ALLOCATION | 4 | YES |
| CHANGE OF SYSTEM SETTINGS | 5 | NO |
| SHEET DELETION | 6 | YES |

1920

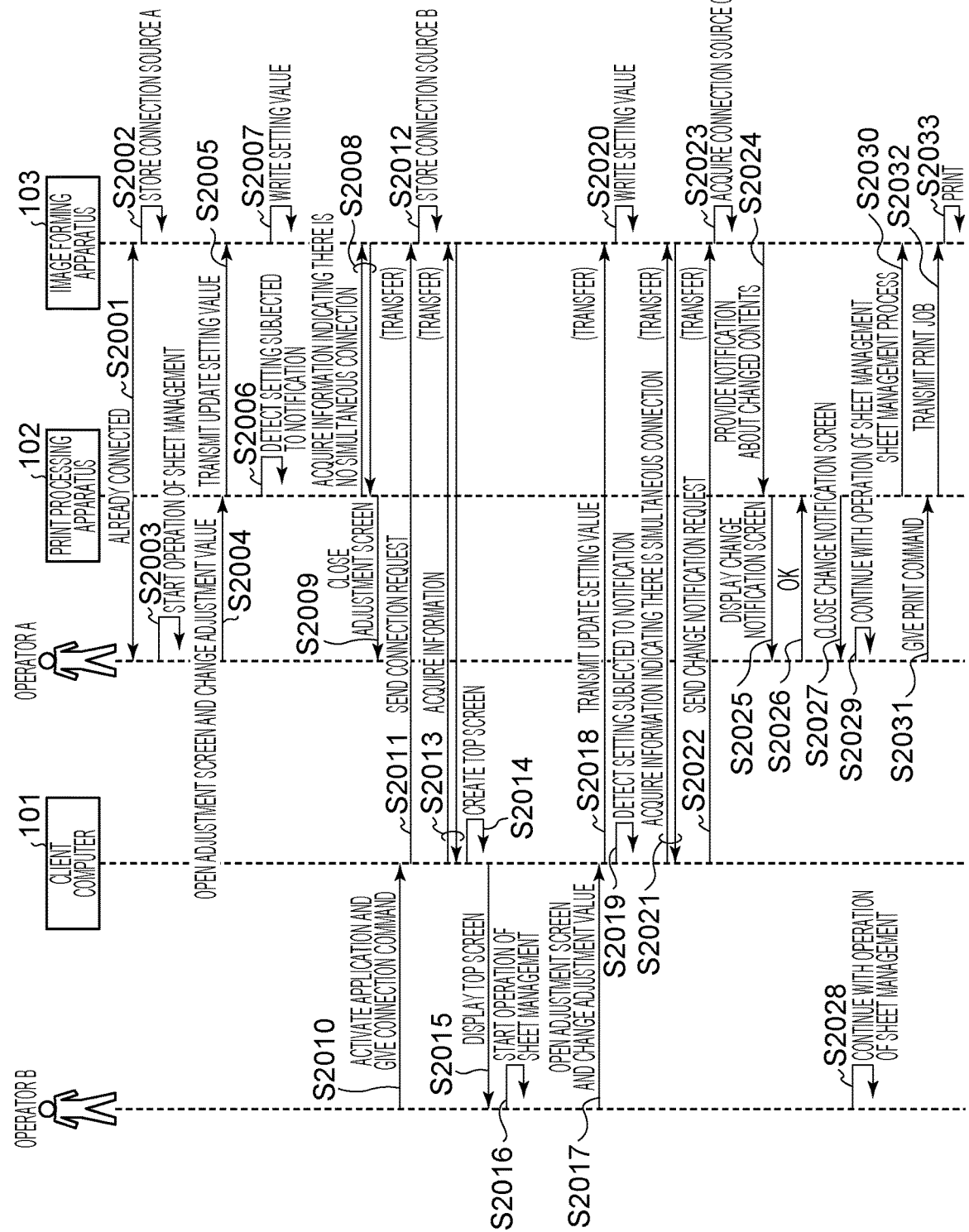

2120

| MESSAGE | MESSAGE ID |
|---|---|
| CHANGE OF SHEETS IN SHEET FEEDERS | 1 |
| CHANGE OF SHEET SETTINGS | 2 |
| NEW SHEET CREATION | 3 |
| SHEET DELETION | 4 |
| | |
| | |

2130

| ADJUSTMENT VALUE | ADJUSTMENT TYPE ID |
|---|---|
| SECONDARY TRANSFER VOLTAGE: FRONT FACE | 1 |
| SECONDARY TRANSFER VOLTAGE: REAR FACE | 2 |
| GLOSSINESS/BLACK-QUALITY (FRONT FACE) | 3 |
| GLOSSINESS/BLACK-QUALITY (REAR FACE) | 4 |
| ... | ... |
| | |

PRINTING SYSTEM OPERABLE FROM PLURALITY OF APPLICATIONS, INFORMATION PROCESSING APPARATUS, AND METHOD AND PROGRAM FOR CONTROLLING INFORMATION PROCESSING APPARATUS

BACKGROUND OF THE INVENTION

Field of the Invention

The present invention relates to printing systems that manage information about sheets used in printing. In particular, such printing systems include image forming apparatuses, such as printers and copiers, and information processing apparatuses, such as personal computers (PCs).

Description of the Related Art

In the related art, image forming apparatuses (printing apparatuses), such as printers, are known as apparatuses that form images onto sheets. Japanese Patent Laid-Open No. 2018-86766 discloses a known printing system that manages information about sheets to be used in such a printing apparatus by using another apparatus (i.e. information processing apparatus).

The information processing apparatus in Japanese Patent Laid-Open No. 2018-86766 is capable of setting adjustment values that contribute to printing for each sheet type, so that a highly-advanced printing process can be realized. Moreover, the sheet types for which the adjustment values are set can be managed by being linked with sheet trays. Therefore, by linking various sheet types with different sheet trays, highly-advanced printing processes can be adaptively performed in accordance with intended purposes. In particular, in Japanese Patent Laid-Open No. 2018-86766, the correspondence relationship between sheet trays and sheet types are displayed as a list on a screen. Therefore, a user may give a command for executing a printing process while checking this screen, so that highly-advanced printing processes can be adaptively performed readily in accordance with intended purposes.

In Japanese Patent Laid-Open No. 2018-86766, sheet management is performed only in the information processing apparatus directly connected to the image forming apparatus. However, in view of user-friendliness, it is desirable that the sheet management can be performed also from another information processing apparatus in the network. In order to achieve this, for example, the other information processing apparatus may be provided with an application for performing the sheet management based on remote control.

However, if sheet management environments are provided to a plurality of information processing apparatuses, there is a concern that the contents of the sheet management may conflict between the plurality of information processing apparatuses. For example, when an operator A tries to give a print command while checking a sheet management screen of one information processing apparatus, if an operator B changes an adjustment value using another information processing apparatus, there is a concern that printing may be executed based on an adjustment value not intended by the operator A.

SUMMARY OF THE INVENTION

The present invention provides a sheet management system that is capable of executing sheet management of an image forming apparatus from a plurality of information processing apparatuses and that can suppress a situation where printing is executed based on an adjustment value not intended by a user.

The present invention provides a printing system including a printing apparatus that is provided with a plurality of sheet containers and that is capable of registering sheet information in correspondence with the sheet containers. The printing apparatus is capable of updating print adjustment information linked with the sheet information in accordance with a request from a sheet management application executed by an external apparatus. The printing apparatus includes a unit configured to retain information about the external apparatus executing the sheet management application. The unit is configured to simultaneously retain information about a plurality of external apparatuses. The external apparatus includes a display configured to display information and a unit configured to cause the display to display an execution screen of the sheet management application. The execution screen is capable of listing the sheet information registered in correspondence with the plurality of sheet containers. The execution screen includes a message indicating that the sheet management application should not he executed simultaneously by a plurality of external terminals.

Further features of the present invention will become apparent from the following description of exemplary embodiments with reference to the attached drawings.

BRIEF DESCRIPTION OF THE DRAWINGS

FIG. 1B illustrates a sheet management screen.

FIG. 7 illustrates the basic flow of sheet management.

FIG. 8B illustrates a sheet setting screen.

FIG. 9A illustrates a sheet/adjustment-value table, and FIG. 9B illustrates a cassette/sheet table.

FIG. 10 illustrates the flow of a use case according to a first embodiment.

FIG. 11B illustrates the flow of a connection-source management process.

FIG. 15A illustrates a first state of an IP-address storage table, FIG. 15B illustrates a second state of the IP-address storage table, and FIG. 15C illustrates a third state of the IP-address storage table.

FIG. 18 illustrates the flow of a use case according to a third embodiment.

FIG. 20 illustrates the flow of a use case according to a fourth embodiment.

DESCRIPTION OF THE EMBODIMENTS

Embodiments of the present invention will be described below with reference to the drawings. The basic configuration of a sheet management system will be described first, and then the configuration corresponding to each use case will be described in detail for each embodiment. Each of the embodiments of the present invention described below can be implemented solely or as a combination of a plurality of the embodiments or features thereof where necessary or where the combination of elements or features from individual embodiments in a single embodiment is beneficial.

Sheet Management System

Figure 1A:
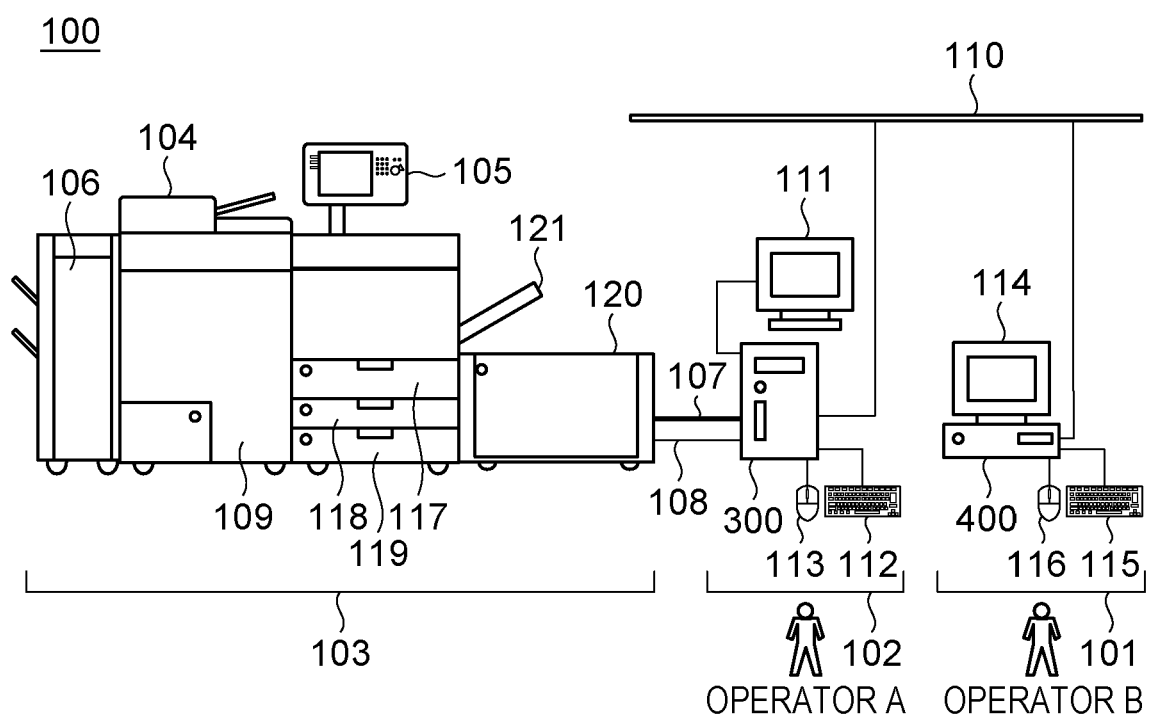
FIG. 1A illustrates the configuration of a sheet management system.

An outline of a sheet management system will now be described. FIG. 1A illustrates the configuration of a sheet management system (printing system) 100. The sheet management system 100 in FIG. 1A includes a client computer 101, a print processing apparatus 102, and an image forming apparatus 103 that are connected to one another in a communicable manner. The client computer 101 and the print processing apparatus 102 function as external terminals (information processing apparatuses) with respect to the image forming apparatus 103.

The client computer 101 and the print processing apparatus 102 are connected in a communicable manner by a local area network (LAN) 110. The print processing apparatus 102 and the image forming apparatus 103 are connected by an image video cable 107 and a control cable 108. The image forming apparatus 103 is not directly connected to the LAN 110. The image forming apparatus 103 and the client computer 101 communicate with each other via the print processing apparatus 102. Alternatively, the image forming apparatus 103 may be connected to the LAN 110. In other words, the image forming apparatus 103 may be directly connected in a communicable manner to the client computer 101.

The image forming apparatus 103 is a multifunction apparatus having various functions. The image forming apparatus 103 executes printing based on data received from the client computer 101 or the print processing apparatus 102. Moreover, the image forming apparatus 103 is capable of copying image data read from a document, as well as transmitting the image data to a shared folder.

The client computer 101 operates the sheet management system 100 by activating an application, and also sends a print command from a printer driver.

The print processing apparatus 102 operates the sheet management system 100 by activating an application, and also sends a print command from a printer driver. The print processing apparatus 102 has a function of performing imaging processing by operating in cooperation with the image forming apparatus 103. The print processing apparatus 102 functions as a reception port for the image forming apparatus 103 in the LAN 110, and transfers image-formation-related information to the image forming apparatus 103 if such information is received. For example, if the image forming apparatus 103 is to be operated from the client computer 101 by using a sheet management application or a printer driver, the print processing apparatus 102 may be designated as a communication destination.

A user performs print management by displaying print management screens in the client computer 101 and the print processing apparatus 102. FIG. 1B illustrates a print management screen 150. The print management screen 150 includes a window for a sheet management application 151 and a window for a printer driver 152. The user uses the sheet management application 151 to manage sheet information, and uses the printer driver 152 to give an execution command for executing a print job.

Image Forming Apparatus

Figure 2A:
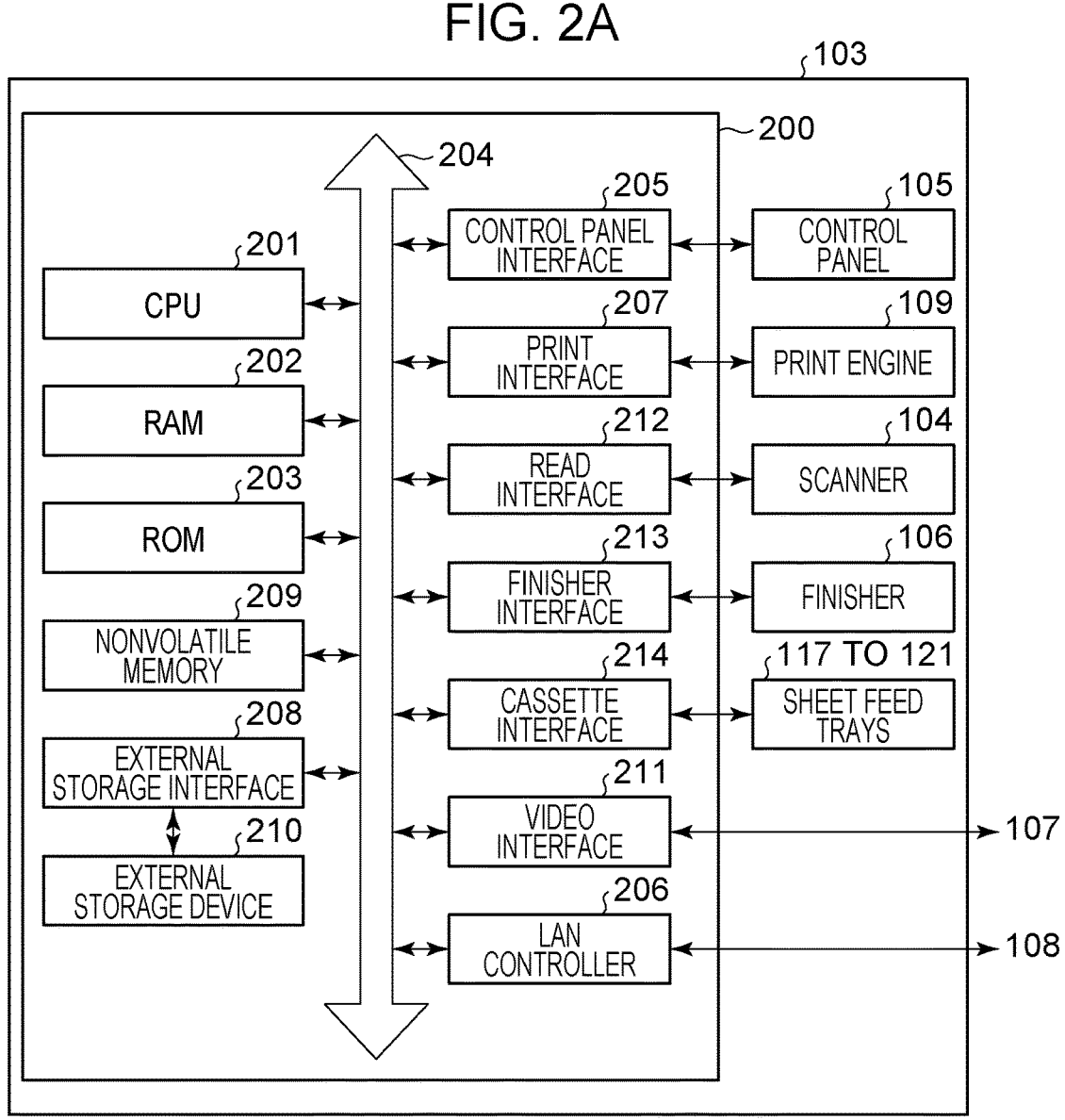
FIG. 2A illustrates a hardware configuration of an image forming apparatus.

The configuration of the image forming apparatus 103 will now be described. FIG. 2A illustrates a hardware configuration of the image forming apparatus 103.

As shown in FIG. 2A, the image forming apparatus 103 includes a control panel 105, a print engine 109, a scanner 104, a finisher 106, sheet feed trays 117 to 121, and a controller 200.

The control panel 105 is a panel that displays information to the user and receives an operation performed by the user. The control panel 105 includes a display unit, such as a liquid crystal screen, and an input unit, such as a touch sensor and hardware keys.

The print engine 109 is an image formation processor that forms an image into a sheet. In the print engine 109, printing is performed by forming an image using, for example, electrophotography, and thermally fixing a toner image onto a sheet.

The scanner 104 is a reading device that reads a document. The document may be read on a document platen or by using an automatic document feeder (ADF).

The finisher 106 is a post-processing device that performs post-processing on a sheet. The finisher 106 performs, for example, sorting, punching, and/or stapling on a sheet conveyed from the print engine 109, and then outputs the sheet.

Each of the sheet feed trays 117 to 121 is a sheet container that contains therein sheets to be used in image formation. The sheet feed trays are individually given numbers, so that information about the contained sheets can be managed by using the sheet management application.

The controller 200 comprehensively controls the image forming apparatus 103. The controller 200 includes a central processing unit (CPU) 201, a random access memory (RAM) 202, a read-only memory (ROM) 203, a nonvolatile memory 209, a control panel interface 205, a print interface 207, a read interface 212, a finisher interface 213, a cassette interface 214, an external storage interface 208, a video interface 211, and a LAN controller 206.

The CPU 201 comprehensively controls the access to various types of devices connected to a system bus 204 based on a control program stored in the ROM 203 or an external storage device 210. For example, the RAM 202 mainly functions as a main memory and a work area for the CPU 201. The interfaces 205, 207, 212, 213, 208, and 214 allow for input and output of data between the connected devices and the CPU 201.

The external storage device 210 is a storage unit for storing data and is, for example, a hard disk drive (HDD). The external storage device 210 is used for storing, for example, application programs, font data, and form data. The external storage device 210 is used as a job storage area for temporarily spooling a print job and controlling the spooled job from the outside. The external storage device 210 retains image data read from the scanner 104 and image data of a print job as held print data. The external storage device 210 retains various types of logs, such as a job log and an image log. The nonvolatile memory 209 stores various types of setting information. The video interface 211 receives image data transmitted from the print processing apparatus 102 via the cable 107. The LAN controller 106 communicates with the print processing apparatus 102 via the cable 108 and receives, for example, a control command.

Figure 2B:
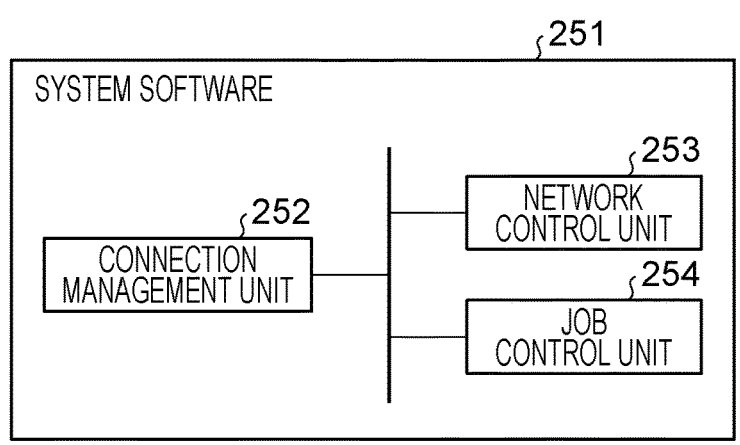
FIG. 2B illustrates a software configuration of the image forming apparatus.

FIG. 2B illustrates a software configuration of the image forming apparatus 103. System software 251 that controls the image forming apparatus 103 includes a connection management unit 252, a network control unit 253, and a job control unit 254. The system software 251 is realized by the CPU 201 executing a program within the controller 200. In other words, the controller 200 functions as various types of units in the system software 251.

The connection management unit 252 performs connection management between the image forming apparatus 103 and an application in the client computer 101 or the print processing apparatus 102. The connection management unit 252 is capable of managing the number of connected applications and exchanging information with the client computer 101 or the print processing apparatus 102. Connection-source information is managed as shown in FIGS. 15A to 15C. The network control unit 253 controls communication with the print processing apparatus 102 via the LAN controller 206. The job control unit 254 performs print control, including controlling the print processing sequence or the sequence of jobs.

Print Processing Apparatus

Figure 3A:
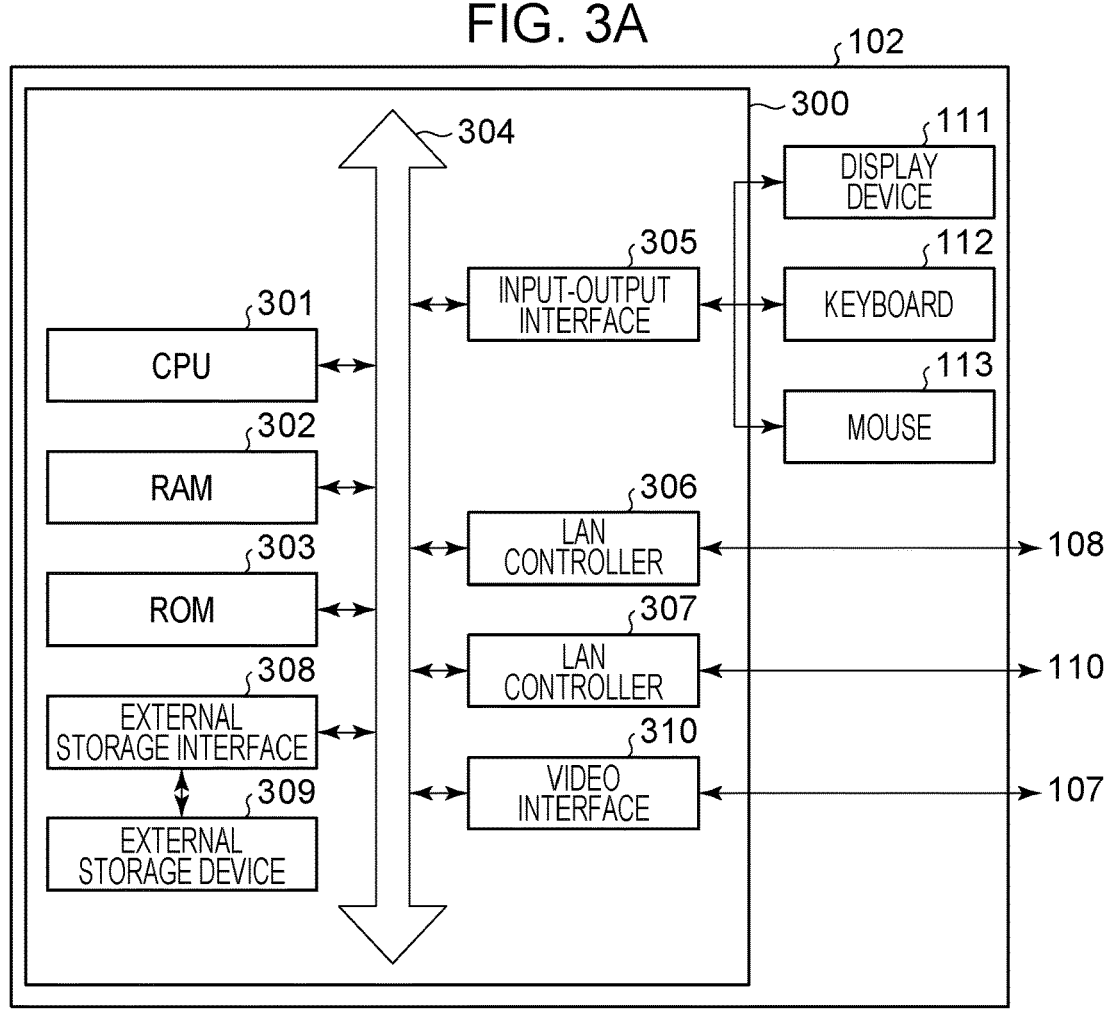
FIG. 3A illustrates a hardware configuration of a print processing apparatus.

The configuration of the print processing apparatus 102 will now be described. FIG. 3A illustrates a hardware configuration of the print processing apparatus 102.

As shown in FIG. 3A, the print processing apparatus 102 includes a display device 111, a keyboard 112, a mouse 113, and a controller 300.

The display device 111 is a display unit that displays information and is, for example, a liquid crystal monitor.

The keyboard 112 and the mouse 113 are input units that receive an input operation performed by the user.

The controller 300 comprehensively controls the print processing apparatus 102. The controller 300 includes a CPU 301, a RAM 302, a ROM 303, an input-output interface 305, an external storage interface 308, LAN controllers 306 and 307, and a video interface 310.

The CPU 301 comprehensively controls the access to various types of devices connected to a system bus 304 based on a control program stored in the ROM 303 or an external storage device 309. For example, the RAM 302 mainly functions as a main memory and a work area for the CPU 301. The interfaces 305 and 308 allow for input and output of data between the connected devices and the CPU 301. The external storage device 309 is, for example, a hard disk drive for storing, for example, application programs, font data, and form data, as well as for temporarily spooling a print job. The external storage device 309 is used as a job storage area for performing raster image processing (RIP) on a spooled job and storing the processed job again.

The LAN controller 306 communicates with the image forming apparatus 103 via the cable 108 and transmits, for example, a control command. The LAN controller 307 is connected to a network via the LAN 110. The video interface 310 transmits raster-image-processed image data to the image forming apparatus 103 via the cable 107.

Figure 3B:
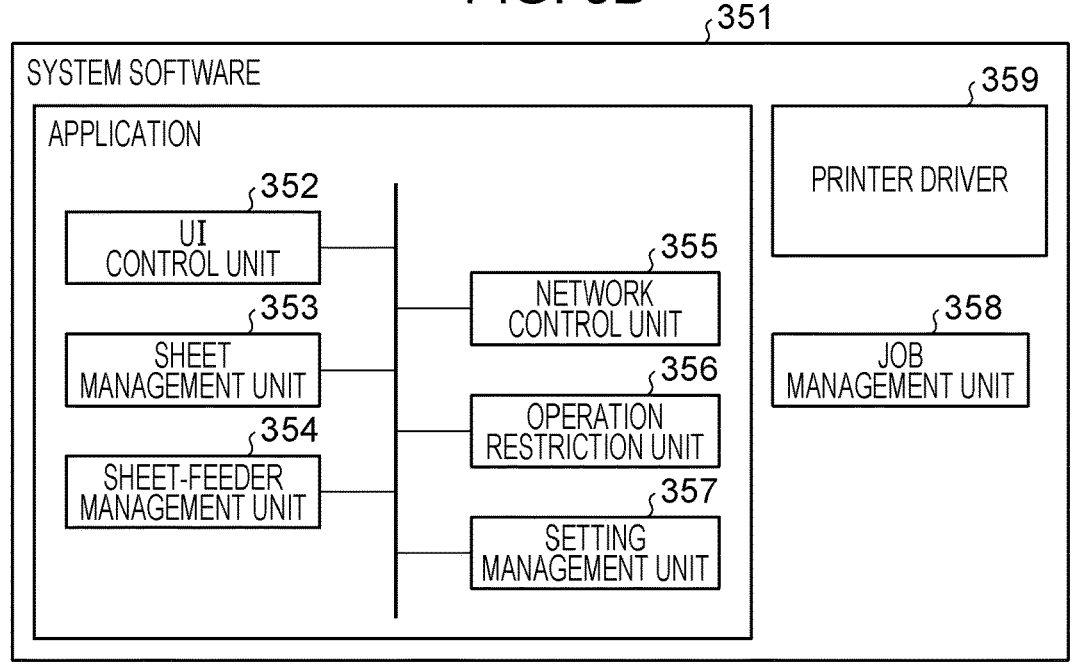
FIG. 3B illustrates a software configuration of the print processing apparatus.

FIG. 3B illustrates a software configuration of the print processing apparatus 102.

System software 351 that controls the print processing apparatus 102 includes an application for performing a sheet management operation, a printer driver for giving a print command, and a job management unit 358.

The application for performing a sheet management operation includes a user-interface (UI) control unit 352, a sheet management unit 353, a sheet-feeder management unit 354, a network control unit 355, an operation restriction unit 356, and a setting management unit 357.

The UI control unit 352 controls a screen to be displayed in the sheet management system 100. The UI control unit 352 is capable of performing control such that the display of display screens for the screen display language and the sheet size is switched in accordance with the system settings.

The sheet management unit 353 communicates with the image forming apparatus 103 and manages acquired sheet information. Sheet information is managed as, for example, a sheet setting management table 910 in FIG. 9A. The sheet management unit 353 is capable of editing, adding, deleting, and searching for sheet information with respect to the sheet setting management table 910. The sheet setting management table 910 is used for managing sheet information for each sheet ID and is managed by the external storage device 309, which is a nonvolatile area.

The sheet-feeder management unit 354 communicates with the image forming apparatus 103 and manages acquired sheet-feeder information. Sheet-feeder information is managed as, for example, a sheet-feeder management table 920 in FIG. 9B. The sheet-feeder management unit 354 is capable of editing, adding, deleting, and searching for sheet-feeder information with respect to the sheet-feeder management table 920. The sheet-feeder management table 920 is used for managing sheet-feeder information for each sheet-feeder ID and is managed by the external storage device 309, which is a nonvolatile area.

The network control unit 355 controls a communication process with the image forming apparatus 103 via the LAN controller 306 and a communication process with the client computer 101 in the network via the LAN controller 307. The network control unit 355 controls a communication process for transmitting and receiving an operation command of the client computer 101 for the sheet management system 100 received via the LAN controller 307 to and from the image forming apparatus 103 via the LAN controller 306.

The operation restriction unit 356 determines whether an operation is related to a print adjustment in multiple connections of applications and controls multiple connections. The determination of whether or not the operation performed by the user is to be restricted is managed by using, for example, an operation restriction table 1620 in FIG. 16. The operation restriction table 1620 is stored in the external storage device 309, which is a nonvolatile area.

The setting management unit 357 manages system settings related to the sheet management system 100 and favorites information, and is capable of editing, adding, deleting, and searching for favorites information. The system settings include, for example, a language setting for the screen display language of the sheet management system 100 and a display unit setting (millimeters or inches) for the sheet size. A setting management table is used for managing setting information of the sheet management system 100. The setting management table is stored in the external storage device 309, which is a nonvolatile area.

The job management unit 358 manages the print processing sequence or the sequence of jobs. The job management unit 358 manages a job received by the print processing apparatus 102 and controls data transferring, for printing, of the received job to the image forming apparatus 103 via the LAN controller 306 and the video interface 310.

Client Computer

Figure 4A:
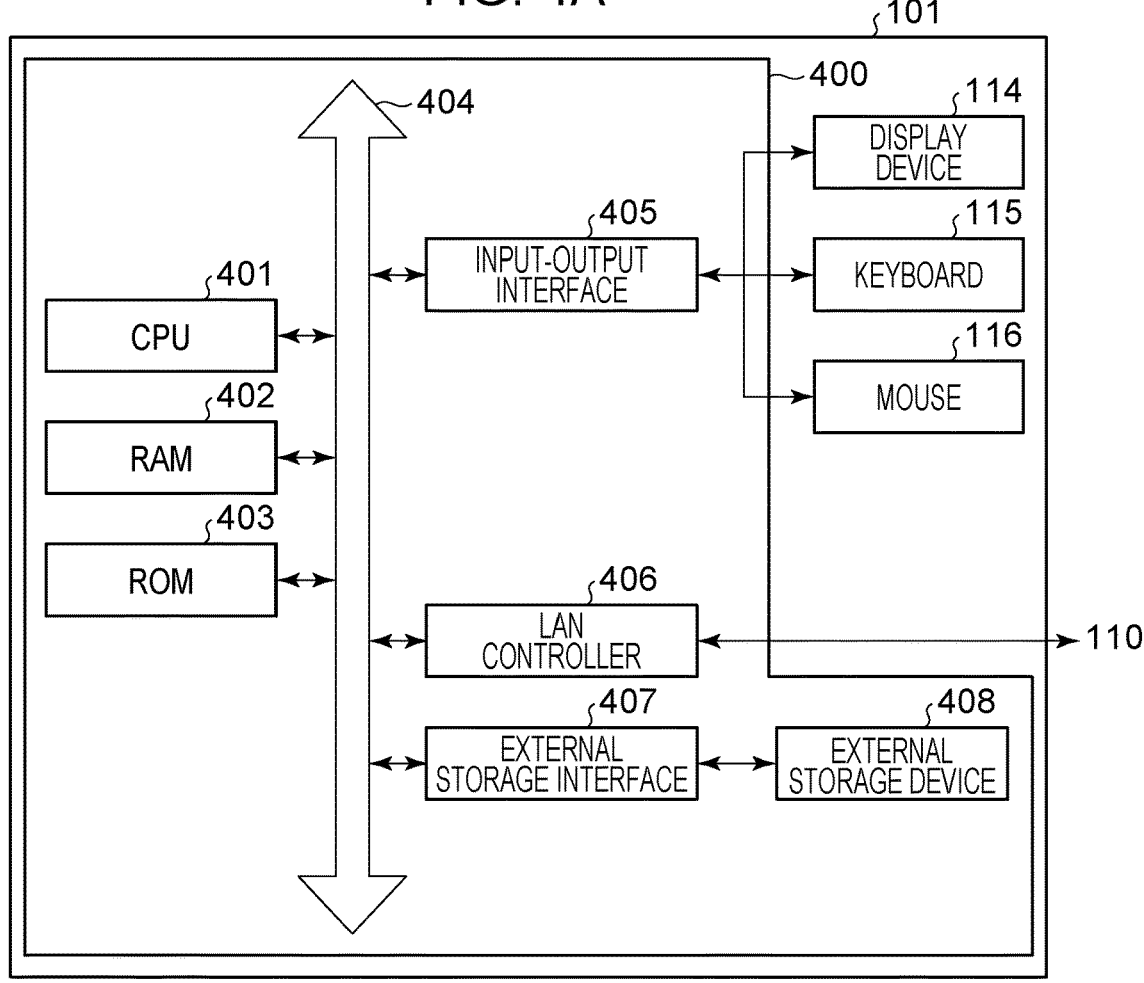
FIG. 4A illustrates a hardware configuration of a client computer.

The configuration of the client computer 101 will now be described. FIG. 4A illustrates a hardware configuration of the client computer 101. As shown in FIG. 4A, the client computer 101 includes a display device 114, a keyboard 115, a mouse 116, and a controller 400.

The display device 114 is a display unit a displays information and is, for example, a liquid crystal monitor.

The keyboard 115 and the mouse 116 are input units that receive an input operation performed by the user.

The controller 400 comprehensively controls the client computer 101. The controller 400 includes a CPU 401, a RAM 402, a ROM 403, an input-output interface 405, an external storage interface 407, and a LAN controller 406.

The CPU 401 comprehensively controls the access to various types of devices connected to a system bus 404 based on a control program stored in the ROM 403 or an external storage device 408. For example, the RAM 402 mainly functions as a main memory and a work area for the CPU 401. The interfaces 405 and 407 allow for input and output of data between the connected devices and the CPU 401. The external storage device 408 stores, for example, application programs, font data, and form data.

Figure 4B:
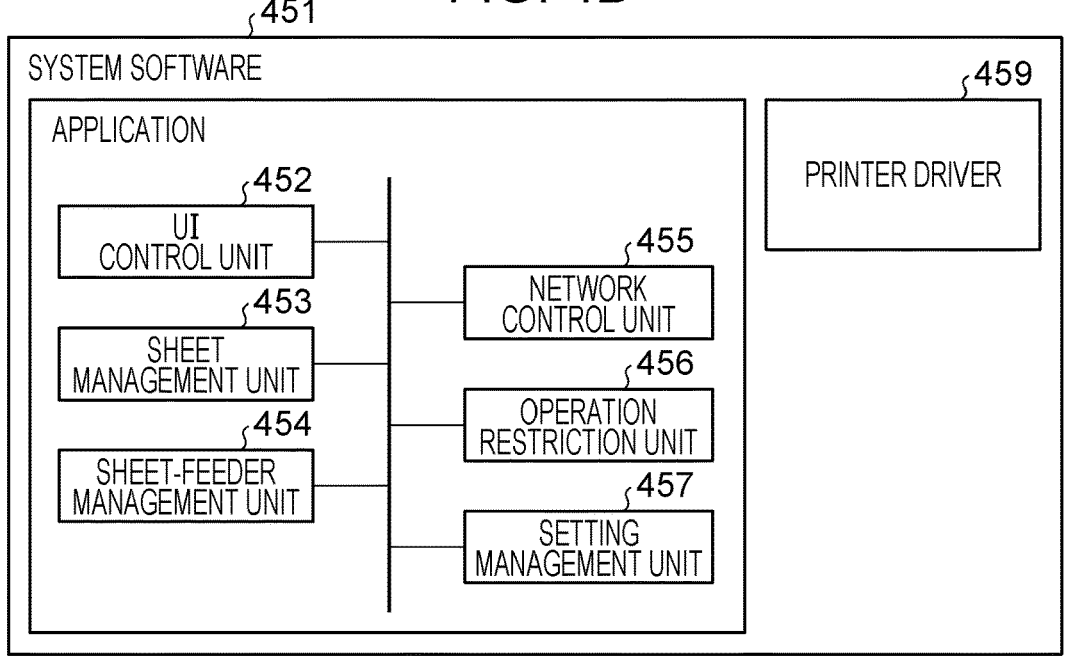
FIG. 4B illustrates a software configuration of the client computer.

FIG. 4B illustrates a software configuration of the client computer 101. System software 451 that controls the client computer 101 includes an application for performing a sheet management operation and a printer driver 459 for giving a print command.

The application for performing a sheet management operation includes a UI control unit 452, a sheet management unit 453, a sheet-feeder management unit 454, a network control unit 455, an operation restriction unit 456, and a setting management unit 457. Since these units are identical to the corresponding units in FIG. 3B, descriptions thereof will be omitted.

Flow of Operation from Sheet Setting to Printing

The flow of a process including changing the sheet settings by an operator and performing printing will now be described with reference to FIG. 7.

In step S700, the print processing apparatus 102 activates the sheet management application.

In step S701, the operator presses a sheet list button 811 on a top screen (execution screen) 810 of the sheet management application.

In step S702, the controller 300 performs control to cause the UI control unit 352 to acquire the sheet setting management table 910 from the sheet management unit 353. The controller 300 performs control to cause the UI control unit 352 to create a sheet list screen 830 in accordance with an acquired sheet list.

In step S703, the controller 300 performs control to cause the UI control unit 352 to display the sheet list screen 830 on the display device 111.

In step S704, the operator selects a sheet to be used in printing by left-clicking on the sheet list screen 830. The controller 300 controls the UI control unit 352 so that the sheet selected by left-clicking is in a selected state. The operator right-clicks a name region for registering the sheet to a sheet feeder.

In step S705, if the controller 300 detects a right-click, the controller 300 performs control to cause the UI control unit 352 to create a sheet registration context menu. The controller 300 performs control to acquire, from the sheet management unit 353, a settable sheet-feeder ID in the sheet setting management table 910 corresponding to the sheet, and to acquire a corresponding sheet-feeder name from the sheet-feeder management table 920. For example, in the example in FIGS. 9A and 9B, the controller 300 acquires settable sheet-feeder IDs={1, 2, 3, 4, 5} for a sheet A (sheet ID=1) and acquires sheet-feeder names of the respective sheet-feeder IDs from the sheet-feeder management table 920. In this example, a sheet cassette 1, a sheet cassette 2, a sheet cassette 3, a sheet cassette 4, and a manual feed tray are acquired, and the controller 300 causes the UI control unit 352 to create a sheet registration context menu.

In step S706, the controller 300 performs control to cause the UI control unit 352 to display the sheet registration context menu, enabling the operator to register the sheet to the desired sheet feeder.

In step S707, the operator selects a sheet to be used in printing and double-clicks it on the sheet list screen 830.

In step S708, the controller 300 performs control to cause the UI control unit 352 to create a sheet setting screen 850.

In step S709, the controller 300 performs control to cause the UI control unit 352 to display the sheet setting screen 850.

In step S710, the operator double-clicks a secondary-transfer-voltage adjustment in a sheet-information adjustment item list 852 on the sheet setting screen 850.

In step S711, the controller 300 performs control to cause the UI control unit 352 to create a secondary-transfer-voltage adjustment screen 890.

In step S712, the controller 300 performs control to cause the UI control unit 352 to display the secondary-transfer-voltage adjustment screen 890.

In step S713, the operator changes an adjustment value on the secondary-transfer-voltage adjustment screen 890 and clicks an OK button 892.

In step S714, the controller 300 performs control to cause the sheet management unit 353 to set the adjustment value in the image forming apparatus 103.

In step S715, the controller 200 performs control to set the received adjustment value.

In step S716, the controller 300 performs control to cause the UI control unit 352 to close the secondary-transfer-voltage adjustment screen 890.

In step S717, the controller 300 performs control to cause the UI control unit 352 to display the sheet setting screen 850.

In step S718, the operator clicks an OK button 854 on the sheet setting screen 850 so as to terminate the sheet-setting changing process.

In step S719, the controller 300 performs control to cause the UI control unit 352 to close the sheet setting screen 850.

In step S720, the operator selects a sheet to be used in printing on the sheet list screen 830, and selects the sheet cassette I from the sheet registration context menu described in step S705 so as to register the sheet to the sheet feeder.

In step S721, the controller 300 performs control to cause the sheet management unit 353 to create a sheet setting command for registering information about the sheet setting management table 910 corresponding to the selected sheet in the sheet cassette 1. The controller 300 causes the network control unit 355 to transmit the sheet setting command to the image forming apparatus 103 via the control cable 108 by controlling the LAN controller 306.

In step S722, when the LAN controller 206 receives the sheet setting command, the controller 200 sets the sheet information about the received sheet to the designated sheet feeder (i,e, the sheet cassette 1 in this case). The controller 300 increments a count value in the usage history of the sheet for which the sheet setting process has been performed, and performs control to cause the sheet management unit 353 to write the usage history onto the usage history of the sheet setting management table 910 for the target sheet ID.

The process for setting the sheet to be used in printing has been described above. The sheet, for which the setting process is to be performed, may be stored in the corresponding sheet feeder at any timing.

Next, the flow for performing printing based on a job 1 of Corporation A by using the set sheet will now be described.

When a print job is to be input, the operator gives a command for displaying the top screen in step S723 to list the correspondence relationship between sheet feeders and sheets. When the command for displaying the top screen is received, the print processing apparatus 102 acquires most-recent sheet setting information from the image forming apparatus 103 in step S724. Then, the print processing apparatus 102 presents the top screen based on the acquired most-recent information to the operator in step S725.

When the operator confirms the top screen, the operator activates a print application or the printer driver so as to give a print command in step S726. In the print application or the printer driver, the type of sheet to be used in printing and a sheet feeder are designated. When the print command is given, the printer driver outputs page-description language (PDL) data. The output data is managed by the job management unit 358. Then, in step S727, the controller 300 performs raster image processing based on the acquired PDL, data so as to generate, for example, raster image data readable by the image forming apparatus 103. The controller 300 analyzes the print command contained in the PDL data and creates print adjustment information to be used in print processing.

In step S728, the controller 300 transmits the image data and the print adjustment information to be used in print processing as print data to the image forming apparatus 103. In this case, the sheet cassette 1 is designated as a sheet feeder in the print data. The controller 300 causes the network control unit 355 to control the LAN controller 306. Then, the controller 300 transmits the print adjustment information to the image forming apparatus 103 via the control cable 108. The controller 300 causes the job management unit 358 to control the video interface 310, and transmits the image data to the image forming apparatus 103 via the image video cable 107.

In step S729, the controller 200 confirms a sheet feeder that is to feed sheets in accordance with the received print data. In this case, since the sheet cassette 1 is designated as a sheet feeder in the print data, the sheet cassette 1 is used.

In step S730, the controller 200 outputs an image signal to the print engine 109 connected via the print interface 207. Accordingly, the print engine 109 receives the image signal and executes printing.

The flow of the process from changing the settings to performing printing has been described above. The following embodiments are assumed to be implemented in an environment in which the flow of such a process is performed.

Sheet Management Application

As described above, in the print processing apparatus 102 or the client computer 101, the sheet management application is executed. The sheet management application provides screen information for prompting the operator to perform an operation. In detail, in the case that the sheet management application is executed in the print processing apparatus 102, the CPU 301 that executes the sheet management application renders an image in the RAM 302, and image data rendered in the RAM 302 is output as a video signal to the display device 111, so that a screen is displayed.

Top Screen

Figure 8A:
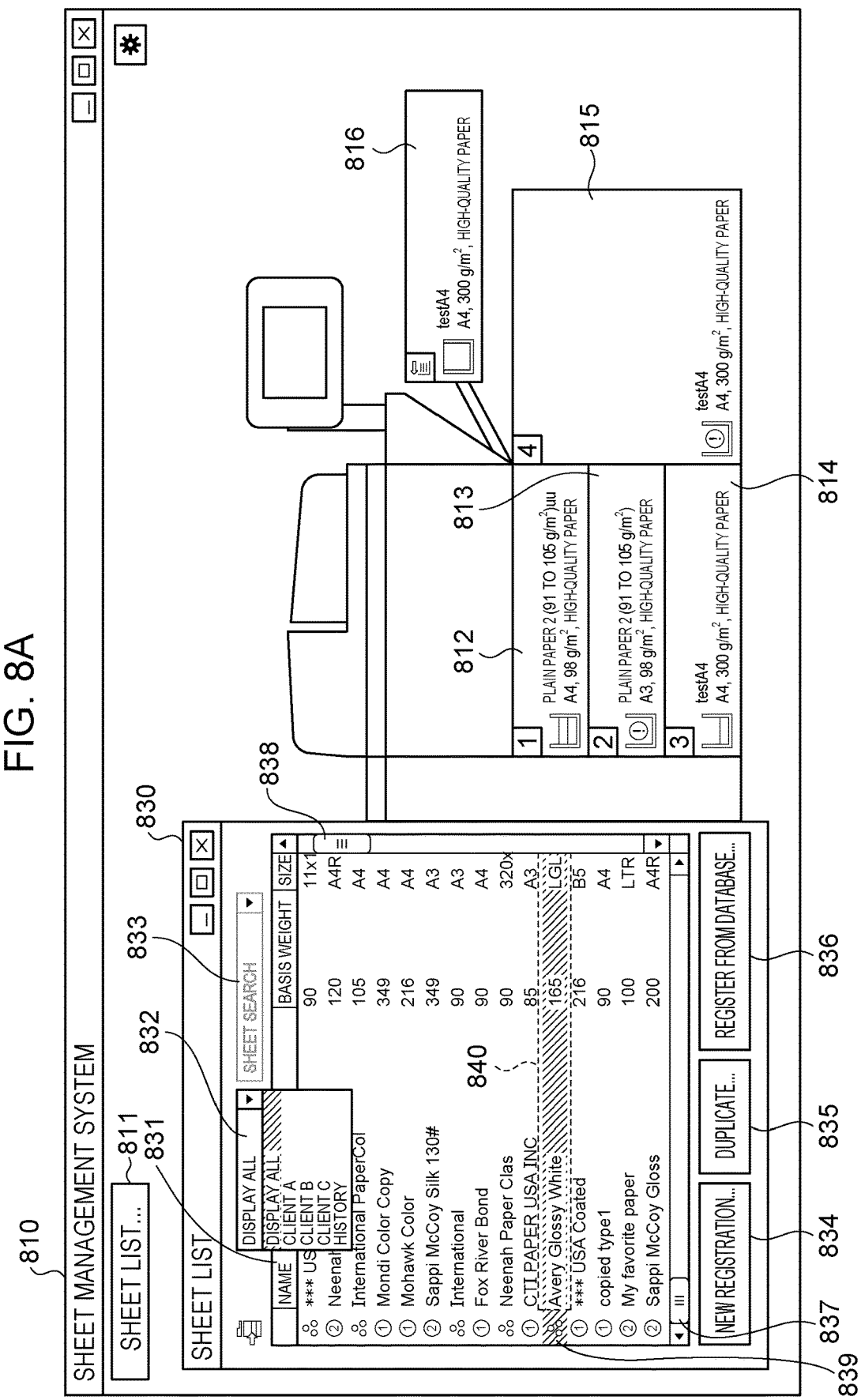
FIG. 8A illustrates a sheet list screen.

The top screen of the sheet management application will now be described. FIG. 8A illustrates a screen list screen.

The top screen 810 is a screen displaying information about sheet feeders in the image forming apparatus 103. The top screen 810 indicates connection statuses of hardware options of the image forming apparatus 103 connected to the print processing apparatus 102. At the time of activation, the sheet management application acquires hardware option information of the image forming apparatus 103 and displays a proper image in accordance with this option information.

The sheet list button 811 is used for giving a command for displaying a sheet list screen. In this embodiment, when the sheet list button 811 is pressed, the controller 300 displays the sheet list screen 830 in FIG. 8A such that the sheet list screen 830 is displayed in the foreground.

Sheet-feeder buttons 812 to 816 are arranged based on information about the sheet feeders of the image forming apparatus 103 acquired at the time of activation of the sheet management application. FIG. 8A illustrates a state where five sheet feeders (one of which is a manual feed tray) are connected. If the controller 300 receives a sheet-feeder-status changing event from the image forming apparatus 103 when the statuses of the sheet feeders in the image forming apparatus 103 are changed, the controller 300 acquires the sheet-feeder information again. When the button 812 for the sheet feeder 1 is pressed by using, for example, the mouse 113, a sheet setting screen for the sheet feeder 1 is displayed.

Sheet List Screen

A sheet list screen will now be described. FIG. 8A illustrates the sheet list screen 830.

The sheet list screen 830 is a screen that displays a list of sheets and that can be used for performing operations for drafting a sheet, duplicating a sheet, deleting a sheet, changing the settings, and registering a selected sheet in a sheet feeder.

The sheet list screen 830 renders an image in the RAM 302 in accordance with a command from the CPU 301 and outputs and displays the image data rendered in the RAM 302 as a video signal to the display device 111. The sheet list screen 830 displays a sheet list 831, a pull-down menu 832 used for selecting a sheet-list displaying method, a sheet search input area 833, and a sheet add button for adding a sheet to the sheet list. The sheet add button includes a new registration button 834 for registering a new sheet to the sheet list, a duplicate button 835 for duplicating an already-existing sheet in the sheet list, and a register button 836 for creating a sheet from a sheet database.

The sheet list 831 is a table that displays a sheet list and that has sheet information set in a row and sheets set in a column. Information outside the display range of the display region is displayable by operating a slider bar 837 and a slider bar 838. A selected sheet is highlighted so that it is clearly distinguishable that it is selected. When any of non-selected sheets is selected from the table of the sheet list 831, information about the selected sheet is displayed in the sheet display region of the sheet list 831.

The pull-down menu 832 used for selecting a sheet-list displaying method will now be described. The pull-down menu 832 displays methods for displaying the display region of the sheet list 831 and has options for filtering the display contents of the sheet-list display region.

The search input area 833 will now be described. The search input area 833 is used by the operator for inputting a keyword used for searching for a desired sheet from the sheets on the sheet list 831.

When a row 839 displaying a favorites icon is right-clicked, a favorites registration menu is displayed, and a sheet can be set as one of the favorites. When another row 840 is right-clicked, the sheet registration context menu is displayed. By selecting a registerable sheet feeder, the selected sheet can be registered. If a delete key is pressed in a state where a sheet is selected, the sheet selected from the sheet list can be deleted.

Sheet Setting Screen

The sheet setting screen 850 will now he described. FIG. 8B illustrates the sheet setting screen 850. The sheet setting screen 850 in FIG. 8B will be described. The sheet setting screen 850 is used for newly registering a sheet and for editing an already-registered sheet. The sheet setting screen 850 includes a basic input item 851, a sheet-information adjustment item list 852, a pull-down menu 853 for changing a display group of the adjustment item list, an OK button 854, and a cancel button 855. The basic input item 851 displays minimum setting items necessary for handling a sheet in the sheet information. In this embodiment, for example, the setting items displayed include name, basis weight, color, surface property, size, characteristics, second face for duplex printing, and favorites. In order to reflect the changed information to the sheet information, the OK button 854 in the sheet setting screen 850 is pressed. By pressing the OK button 854, the sheet information in the print processing apparatus 102 and the image forming apparatus 103 can be changed. By pressing the cancel button 855, changes made to the sheet settings can be canceled.

The adjustment item list 852 includes setting values contained in the sheet information (linked with corresponding sheets) and displays a list of names, adjustment/no adjustment, and display groups with respect to adjustable (updatable) items. With regard to an adjustment of an adjustment item, when the adjustment item is selected on the adjustment item list 852, a specific adjustment value and an adjust button may be displayed on the sheet setting screen 850. By pressing the adjust button, a target adjustment screen may be displayed. An outline of the adjustment items displayed on the adjustment item list 852 will be described. A glossiness/black-quality adjustment item is for adjusting the glossiness of an output image by adjusting the temperature of a fixing unit when plain paper or coated paper is to be used, and is defined, as being in an image quality display group. A secondary-transfer-voltage adjustment item is for changing the voltage when a toner image is to be transferred onto a sheet, and is defined as being in an image quality display group. A trailing-edge white-void correction item is for changing the transfer voltage if the toner is voided or the color is too light at the trailing edge of a sheet in the conveying direction, and is defined as being in an image quality display group. A secondary-transfer-charge-removal-bias adjustment item is for changing the voltage value (charge removal bias) for removing static electricity remaining in an intermediate transfer belt, and is defined as being in an image quality display group. An ITB image-removal adjustment item is for changing the degree of image removal from the intermediate transfer belt, and is defined as being in an image quality display group. A toner-amount adjustment mode is an adjustment item for changing the total amount of toner, and is defined as being in an image quality display group. A primary-transfer-voltage adjustment item is for changing the voltage when a toner image is to be transferred onto a sheet from the intermediate transfer belt, and is defined as being in an image quality display group. A registration-loop adjustment item is for changing the amount of bending of a sheet when an image position is adjusted, and is defined as being in an image quality display group. A registration-speed adjustment item is for changing the speed when the image position is adjusted, and is defined as being in an image quality display group. An image-scraping correction item is for changing the conveying speed when image distortion or uneven density occurs due to a sheet conveying defect caused by deformation of the sheet occurring from an uneven amount of moisture, and is defined as being in an image quality display group. A fixation-pressure adjustment item is for changing the fixation pressure, and is defined as being in an image quality display group. A fixation-speed adjustment item is for changing the fixation speed, and is defined as being in an image quality display group.

An image-position adjustment item is for changing the print positions for the front and rear faces of a sheet, and is defined as being in an image position display group. A leading-edge/trailing-edge margin adjustment item is for changing the lengths of leading-edge and trailing-edge margins in the conveying direction during printing, and is defined as being in an image position display group. An automatic lateral-registration adjustment item is for performing an adjustment such that the image is not displaced perpendicularly (i.e. laterally) to the conveying direction, and is defined as being in an image position display group. A sheet-separating-fan air-volume adjustment item is for changing the volume of air from a fan when sheets are to be separated from each other, and is defined as being in a sheet conveyance display group. A pre-fixation-conveying-fan air-volume adjustment item is for changing the volume of air from a pre-fixation conveying fan, and is defined as being in a sheet conveyance display group.

The pull-down menu 853 can be used for selecting a filter for displaying the adjustment item list 852 for each group. For example, when image quality is selected in the pull-down menu 853, the controller 300 performs control to cause the UI control unit 352 to display only adjustment items with image quality as the display group on the adjustment item list 852.

Connection-Destination Input Screen

Figure 8C:
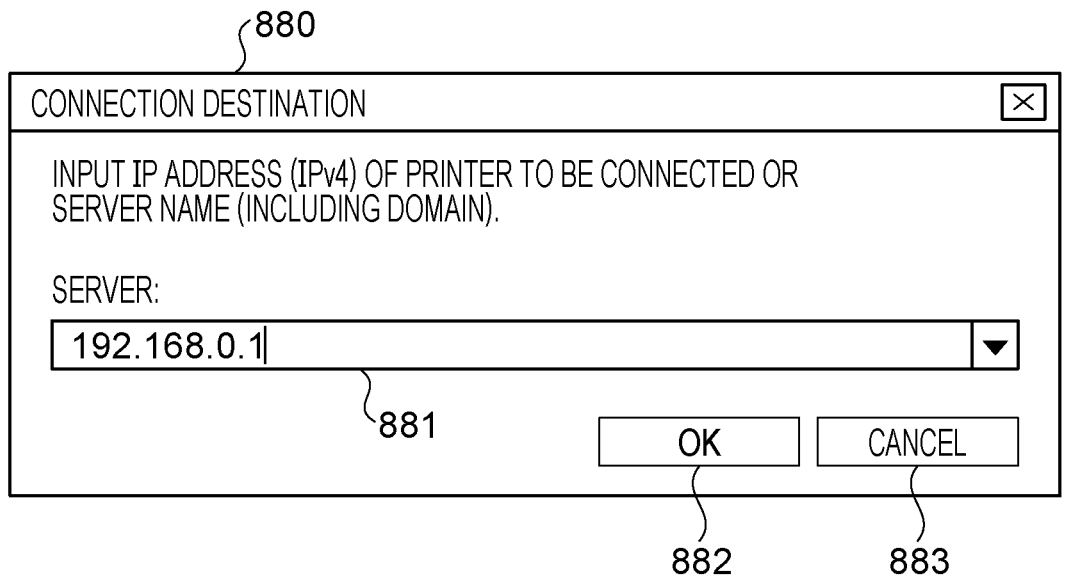
FIG. 8C illustrates a connection-destination input screen.

A connection-destination input screen 880 will now be described. FIG. 8C illustrates the connection-destination input screen 880. The connection-destination input screen 880 is used for designating an image forming apparatus to be desirably managed using the sheet management application. The connection-destination input screen 880 includes a connection-destination-information input region 881, an OK button 882, and a cancel button 883.

The connection-destination-information input region 881 is a region where an IP address or a host name of the print processing apparatus 102 serving as a connection destination is input by using the keyboard 112 or 115 or by using the mouse 113 or 116.

Figure 5:
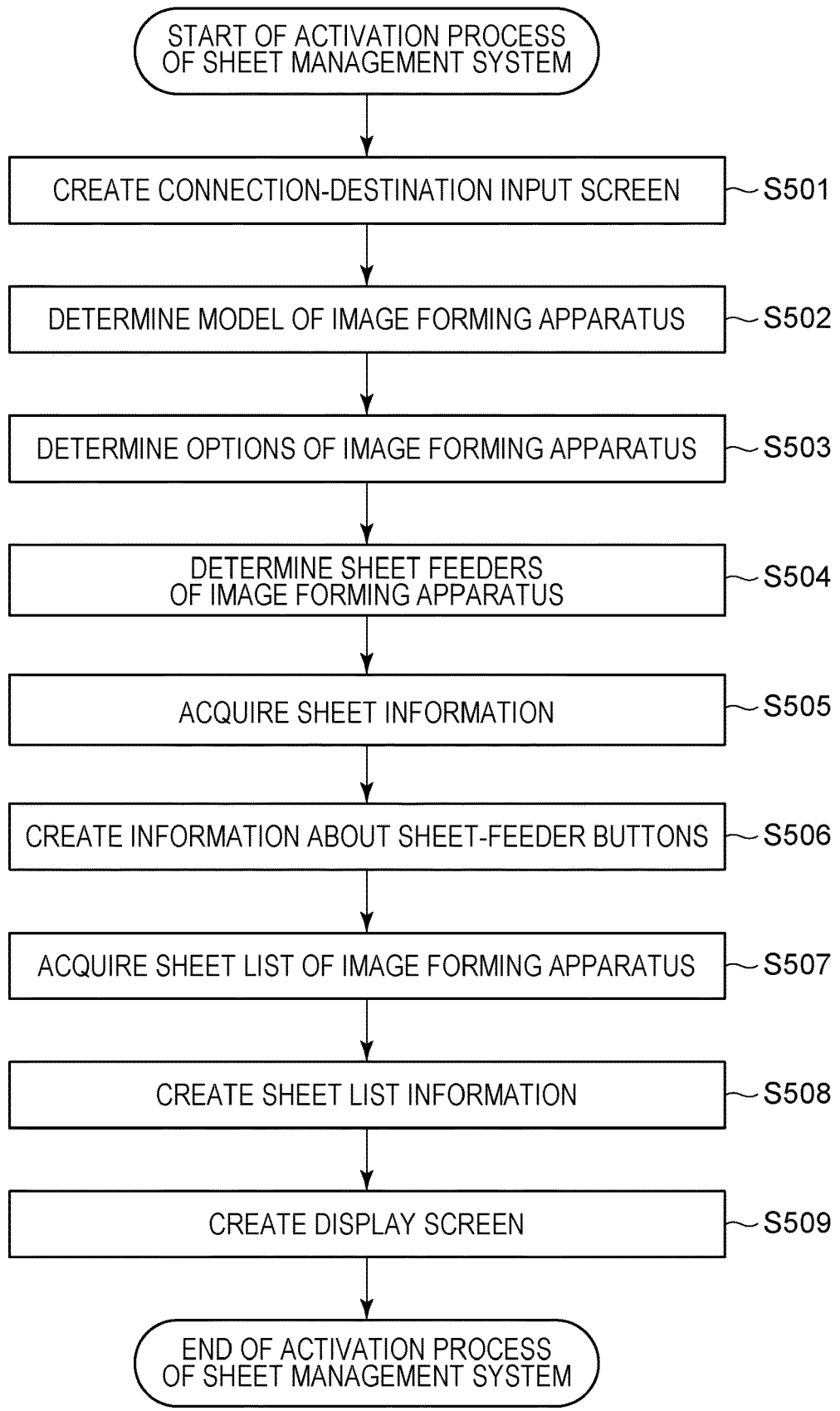
FIG. 5 illustrates the flow of an activation process of a sheet management application.

The OK button 882 is used for connecting to the image forming apparatus 103 and performing the activation process shown in FIG. 5 in accordance with the connection-destination information input to the connection-destination-information input region 881.

The cancel button 883 is used for terminating the application.

Secondary-Transfer-Voltage Adjustment Screen

Figure 8D:
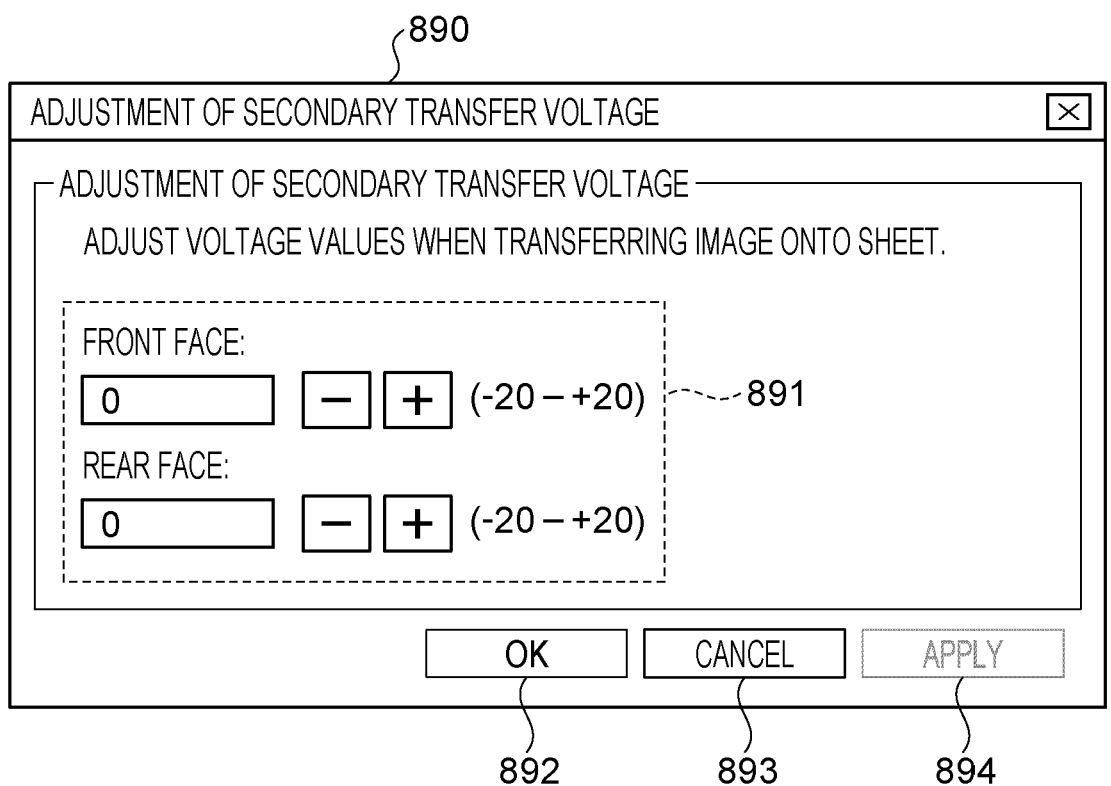
FIG. 8D illustrates an adjustment-value input screen.

The secondary-transfer-voltage adjustment screen will now be described, FIG. 8D illustrates an adjustment-value input screen.

The secondary-transfer-voltage adjustment screen 890 is used for editing an adjustment item for changing the voltage when a toner image is to be transferred onto a sheet. By inputting a setting value to this screen, it is possible to request the image forming apparatus 103 to update the setting value.

The secondary-transfer-voltage adjustment screen 890 includes an adjustment-value input region 891, an OK button 892, a cancel button 893, and an apply button 894. By using the adjustment-value input region 891, voltage values for the front and rear faces can be input, or an adjustment value can be changed by operating a numerical-value changing button on the screen. The OK button 892 is used for setting an adjustment value set in the adjustment-value input region 891 to the image forming apparatus 103. In this embodiment, when the OK button 892 is clicked, the secondary-transfer-voltage adjustment screen 890 is closed. The apply button 894 is similar to the OK button 892 in that it is used for setting an adjustment value set in the adjustment-value input region 891 to the image forming apparatus 103. The apply button 894 is different from the OK button 892 in that the secondary-transfer-voltage adjustment screen 890 is not closed even when the apply button 894 is clicked. This allows printing to be performed from, for example, the printer driver while the secondary-transfer-voltage adjustment screen 890 is being displayed, thereby achieving improved operability in a case where the adjustment value is to be changed again.

Activation Process of Sheet Management Application

A process executed when the sheet management application is activated will now be described. FIG. 5 illustrates the flow of the activation process of the sheet management application.

The program for the sheet management application is stored in the external storage device 309, and is loaded to the RAM 302 so as to be executed by the CPU 301. When the sheet management application is activated, the controller 300 generates the connection-destination input screen 880 (see FIG. 8C), where a connection destination is input, in step S501.

An IP address or a host name of the apparatus serving as a connection destination can be input to the connection-destination input screen 880. When sheet management of the image forming apparatus 103 is to be performed from the client computer 101 via the print processing apparatus 102, the IP address of the print processing apparatus 102 is input to the connection-destination input screen 880. Likewise, when sheet management of the image forming apparatus 103 is to be performed from the print processing apparatus 102, the IP address of the print processing apparatus 102 is input.

When the connection destination is input, the controller 300 connects with the apparatus designated in accordance with the input IP address, in other words the print processing apparatus 102. Then, the image forming apparatus 103 is notified of the IP address of the print processing apparatus 102, and the image forming apparatus 103 is caused to register the IP address. If sheet management is to be performed using the client computer 101, the image forming apparatus 103 is notified of the IP address of the client computer 101, and the image forming apparatus 103 is caused to register the IP address. When the connection is successful, the process proceeds to step S502.

In step S502, the controller 300 determines the model of the image forming apparatus 103 subjected to the sheet management. The controller 300 communicates with the image forming apparatus 103 to acquire model information. Then, based on model determination information preliminarily stored in the sheet management application, the model of the image forming apparatus 103 is determined, so that basic configuration information of the image forming apparatus 103 is acquired. After the model is determined in step S502, the process proceeds to step S503.

In step S503, the controller 300 determines hardware options connected to the image forming apparatus 103. Then, when the top screen 810 is to be created, when sheet-feeder information is to be identified, or when a difference in specifications among models is to be finely adjusted, the model determination information is used. After the hardware option information is acquired by communicating with the image forming apparatus 103, the process proceeds to step S504.

In step S504, the controller 300 determines sheet feeders connected to the image forming apparatus 103 subjected to the sheet management. The number of sheet feeders connected and the sheet-feeder information are acquired. For example, the sheet-feeder information acquired here includes the name of each sheet feeder, the sheet-feeder ID thereof, and the remaining number of sheets in the sheet feeder. When the sheet feeders are determined in step S504, the controller 300 controls the sheet-feeder management unit 354 to write the acquired sheet-feeder information in the sheet-feeder management table 920. The process then proceeds to step S505.

In step S505, the controller 300 communicates with the image forming apparatus 103 so as to acquire sheet information set in each sheet feeder. When the sheet information (sheet ID) of the sheet feeder is acquired in step S505, the controller 300 controls the sheet-feeder management unit 354. Then, the acquired sheet ID is written into a region that matches a target sheet-feeder ID in the sheet-feeder management table 920. The process then proceeds to step S506.

In step S506, the controller 300 creates information about the sheet-feeder buttons 812 to 816 displayed On the top screen 810. The sheet-feeder button 812 corresponds to the sheet feed tray 117. The sheet-feeder button 813 corresponds to the sheet feed tray 118. The sheet-feeder button 814 corresponds to the sheet feed tray 119. The sheet-feeder button 815 corresponds to the sheet feed tray 120. The sheet-feeder button 816 corresponds to the sheet feed tray 121. When the information about each sheet-feeder button is created in step S506, the process proceeds to step S507.

In step S507, the controller 300 communicates with the image forming apparatus 103 so as to acquire sheet list information. The sheet list information contains, for example, a sheet name, parameters required for printing, a favorites ID, a usage history, and a settable sheet-feeder ID. The parameters required for printing are, for example, the basis weight and the size of the sheet to be displayed in the print processing apparatus 102, and the setting values for glossiness/black-quality adjustment to be displayed on the adjustment item list 852. When the sheet list information is acquired in step S507, the controller 300 controls the sheet management unit 353 so as to write the acquired sheet information in the sheet setting management table 910. The process then proceeds to step S508.

In step S508, the controller 300 creates sheet list information to be displayed on the sheet list 831 on the sheet list screen 830. When the sheet list information is created in step S508, the process proceeds to step S509.

In step S509, the controller 300 creates the top screen 810 based on the model information and the hardware option information of the image forming apparatus 103 acquired in steps S502 and S503 and the sheet-feeder information created in step S506. The controller 300 creates the sheet list screen 830 from the sheet list information created in step S508.

An item of a sheet-feeder settable with respect to a sheet is an item to be updated in accordance with the connected image forming apparatus. A sheet-feeder ID settable with respect to a sheet is derived and input based on the sheet information and the configuration information of the image forming apparatus 103. A sheet-feeder ID settable with respect to a sheet may be derived by the print processing apparatus 102 or by the image forming apparatus 103.

The usage history is set as zero times when a sheet is created, based on information indicating the number of times the sheet is registered, and is incremented every time the sheet is registered in the corresponding sheet feeder.

Response Process of Image Forming Apparatus

Figure 6:
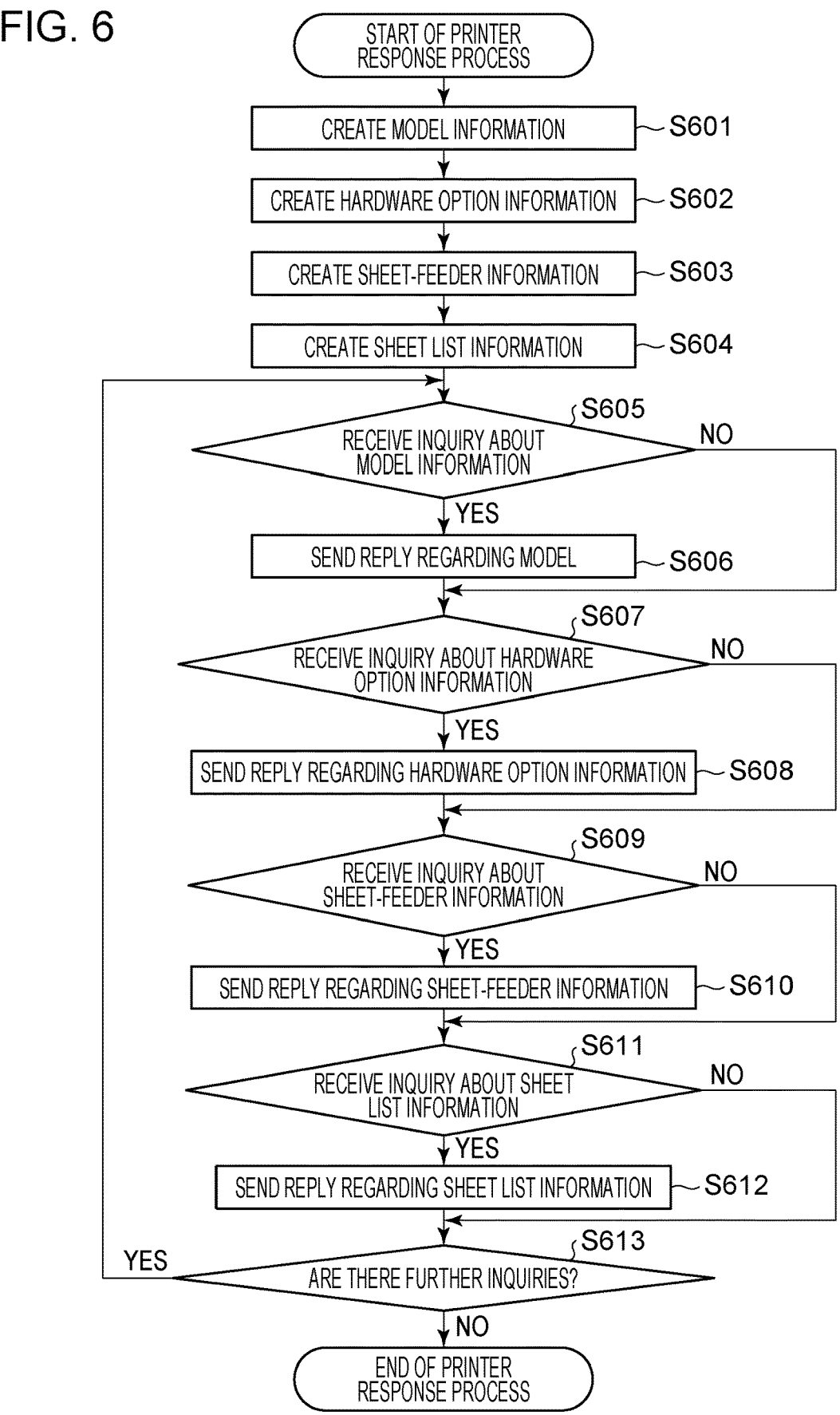
FIG. 6 illustrates the flow of a printer response process.

A process executed by the image forming apparatus 103 concurrently with the activation process of the sheet management application will now be described. FIG. 6 illustrates the flow of a response process of the image forming apparatus 103. A program of the image forming apparatus 103 according to the flowchart in FIG. 6 is stored in the external storage device 210 in FIG. 2, and is loaded to the RAM 202 so as to be executed by the CPU 201.

In step S601, the controller 200 acquires its own model information from the external storage device 210 and stores the model information into the RAM 202 in a data format transferrable to other apparatuses.

In step S602, the controller 200 acquires the hardware option information about the hardware options connected to the image forming apparatus from the print engine 109 via the print interface 207. Then, the controller 200 stores the hardware option information into the RAM 202 in a data format transferrable to other apparatuses.

In step S603, the controller 200 acquires its own sheet-feeder information and stores the sheet-feeder information into the RAM 202 in a data format transferrable to other apparatuses.

In step S604, the controller 200 acquires its own sheet list information from the external storage device 210 and stores the sheet list information into the RAM 202 in a data format transferrable to other apparatuses.

In step S605, the controller 200 determines whether an inquiry about model information is received from the print processing apparatus 102. If an inquiry about model information is received, the process proceeds to step S606 where a reply regarding the model information created in step S601 is transmitted. The process then proceeds to step S607. If an inquiry about model information is not received in step S605, the process proceeds to step S607.

In step S607, the controller 200 determines whether an inquiry about hardware option information is received from the print processing apparatus 102. If an inquiry about hardware option information is received, the process proceeds to step S608 where a reply regarding the hardware option information created in step S602 is transmitted. If an inquiry about hardware option information is not received in step S607, the process proceeds to step S609.

In step S609, the controller 200 determines whether an inquiry about sheet-feeder information is received from the print processing apparatus 102. If an inquiry about sheet-feeder information is received, the process proceeds to step S610 where a reply regarding the sheet-feeder information created in step S603 is transmitted. If an inquiry about sheet-feeder information is not received in step S609, the process proceeds to step S611.

In step S611, the controller 200 determines whether an inquiry about sheet list information is received from the print processing apparatus 102. If an inquiry about sheet list information is received, the process proceeds to step S612 where a reply regarding the sheet list information created in step S604 is transmitted. If an inquiry about sheet list information is not received in step S611, the process proceeds to step S613.

Subsequently, in step S613, if there are further inquiries, the process returns to step S605. If there are no more inquiries, the process ends.

First Embodiment

A first embodiment will be described with reference to a case where a message indicating that "sheet management by multiple operators is not recommended" is displayed on an application screen. In this embodiment, it is possible to perform a setting process related to whether or not this message is to be displayed.

Use Case

FIG. 10 illustrates the flow of a use case according to the first embodiment.

This use case will be described starting from a state where the print processing apparatus 102 and the image forming apparatus 103 are already connected to each other.

In step S1001, an operator A is performing sheet management, and the print processing apparatus 102 and the image forming apparatus 103 are already connected to each other. In this case, the image forming apparatus 103 stores the print processing apparatus 102 as a connection source A.

Subsequently, in step S1003, an operator B activates the sheet management application to start performing sheet management. Then, in order to perform sheet management of the image forming apparatus 103, the IP address of the print processing apparatus 102 is input. In step S1004, the client computer 101 transmits a connection request to register the connection source in the image forming apparatus 103. The connection request includes IP address information of the client computer 101. In step S1005, the image forming apparatus 103 registers the connection source B, which is the IP address of the source of the connection request, thereby completing the connection procedure. Accordingly, the client computer 101 and the image forming apparatus 103 are connected to each other via the print processing apparatus 102.

When the connection procedure is completed, the client computer 101 acquires, for example, sheet-feeder information and sheet information from the image forming apparatus 103 in step S1006. In this case, the client computer 101 acquires simultaneous-connection-related information from the image forming apparatus 103. The simultaneous-connection-related information may be IP-address-list information about a list of managed IP addresses currently connected to the image forming apparatus 103, the number of connection sources currently connected to the image forming apparatus 103, or information indicating whether or not simultaneous connections have occurred, which is determined by the image forming apparatus 103.

The client computer 101 detects that simultaneous connections are occurring in step S1007 based on the simultaneous-connection-related information, and creates a top screen with a message in step S1008. Then, the top screen with the message is presented to the user (operator B) in step S1009.

When an update event of the top screen occurs in the sheet management application in the print processing apparatus 102 in step S1010, the print processing apparatus 102 acquires, from the image forming apparatus 103, the simultaneous-connection-related information in addition to the most-recent sheet information in step S1011. The print processing apparatus 102 detects that simultaneous connections are occurring based on the simultaneous-connection-related information in step S1012, and generates a top screen with a message in step S1013. Then, the top screen with the message is presented to the user (operator A) in step S1014.

In step S1015, the operator A and the operator B confirming the message negotiate with each other to determine the user of the sheet management. As a result of the negotiation, the operator B stops the sheet management in step S1016, whereas the operator A continues with the sheet management in step S1017. Then, after the sheet management process is performed in step S1018, the user gives a print command by using, for example, the printer driver in step S1019. A job corresponding to the print command undergoes raster image processing in the print processing apparatus 102 and is transmitted to the image forming apparatus 103 in step S1020. In step S1021, the image forming apparatus 103 performs printing based on the print data.

Top Screen with Message

Figure 11A:
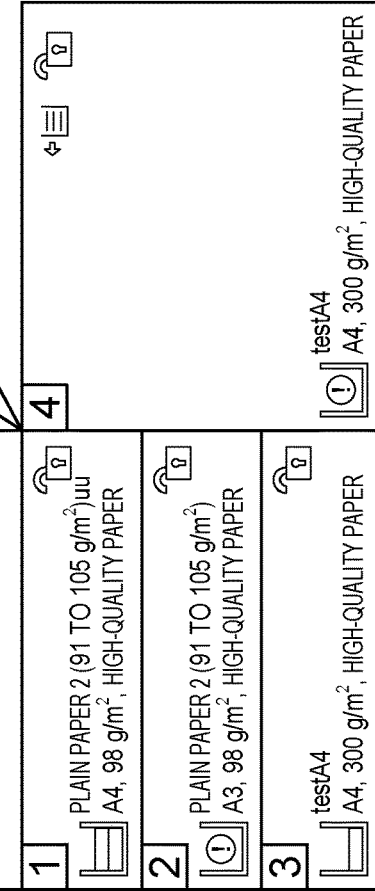
FIG. 11A illustrates a warning screen.

The top screen with the message will now be described. FIG. 11A illustrates a top screen with a message.

The top screen is the first screen displayed after the sheet management application is activated and the connection with the image forming apparatus 103 is established. The top screen can display a list of sheet feeders and sheets registered in correspondence therewith. In this embodiment, this top screen is provided with a message 1101 so as to be displayed as a top screen 1100 with a message.

The message 1101 includes messages "Do not use multiple sheet management applications on the same printer at the same time" and "It may lead to unexpected print results". Specifically, the message 1101 provides a notification indicating that the sheet management application should not be executed simultaneously in multiple apparatuses, and that there should he no multiple connections to the image forming apparatus 103. The message 1101 may be continuously displayed until the application ends, or may be deleted when a certain time elapses after the top screen 1100 with the message is displayed.

Connection-Source Management Process

A connection-source management process will now be described. FIG. 11B illustrates the flow of the connection-source management process.

This process is realized by the controller 200 of the image forming apparatus 103 executing a program. In this connection-source management process, the address of the apparatus executing the sheet management application is retained. Specifically, the image forming apparatus 103 is capable of retaining the addresses of a plurality of apparatuses. Accordingly, it is possible to determine whether or not sheet management is performed simultaneously by a plurality of apparatuses.

In step S1111, the controller 200 receives a connection-management-related request from the outside. If the contents of the connection management include a connection request (i.e. connection request in step S1112), the controller 200 stores the IP address of the connection source in a connection-source management table (S1113) and terminates the process. In contrast, if the contents of the connection management include a disconnection request (i,e, disconnection request in step S1112), the controller 200 deletes the IP address of the connection source film the connection-source management table (S1114) and terminates the process. This disconnection request has a meaning of providing a notification about the termination of the sheet management application.

Top-Screen Displaying Process

Figure 11C:
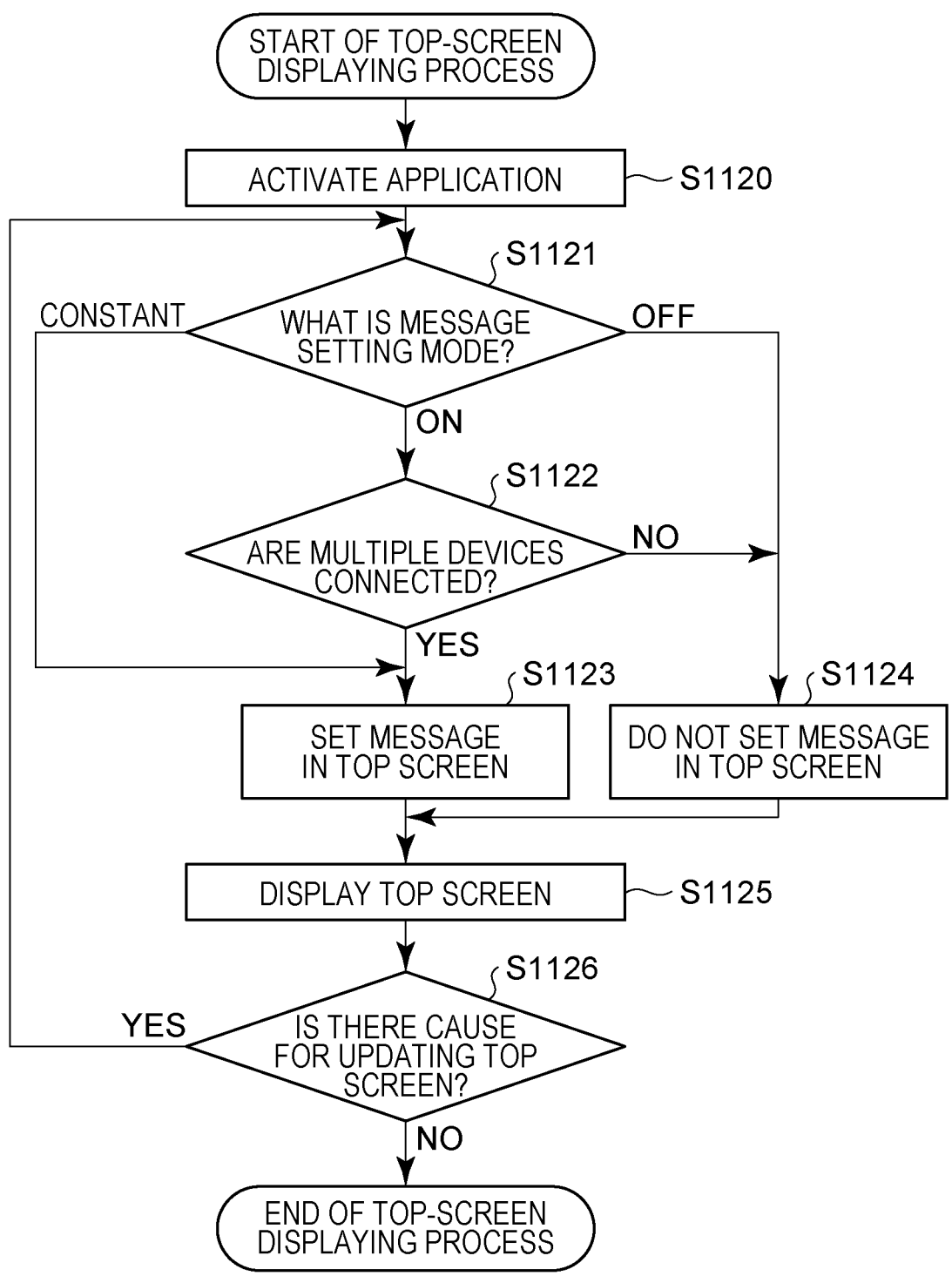
FIG. 11C illustrates the flow of a top-screen displaying process.

A top-screen displaying process will now be described. FIG. 11C illustrates the flow of the top-screen displaying process. In this embodiment, a desired setting mode can be selected from three modes, namely, "constant", "on", and "off" modes, as message display setting modes. The "constant" mode is a mode in which message notification is performed regardless of whether or not there are multiple connections. The "on" mode is a mode in which message notification is performed if multiple connections are detected. The "off" mode is a mode in which message notification is not performed.

The flowchart will be used for the following description.

When the sheet management application is activated in step S1120, the controller (i.e. the controller 300 in this case) of the apparatus executing the sheet management application checks the message setting mode in step S1121. If the message setting mode is the "on" mode, the controller 300 causes the process to proceed to step 51122. If the message setting mode is the "constant" mode, the controller 300 causes the process to proceed to step S1123. If the message setting mode is the "off" mode, the controller 300 causes the process to proceed to step S1124.

In step S1122, it is determined whether or not multiple devices are connected to the image forming apparatus 103. If multiple devices are connected to the image forming apparatus 103 (YES in step S1122), the controller 300 causes the process to proceed to step S1123.

If the image forming apparatus 103 has only its own device connected thereto (NO in step S1122), the controller 300 causes the process to proceed to step S1124, In step S1123, the controller 300 creates information about a top screen having a message.

In step S1124, the controller 300 creates information about a top screen not having a message.

In step S1125, the controller 300 causes the top screen to be displayed. The controller 300 causes the process to return to step S1121 if there is a subsequent cause for updating the top screen (YES in step S1126), or terminates the process if there is no cause for updating the top screen (NO in step S1126).

Remarks

As described above, in this embodiment, a message is displayed on the sheet-management application screen (specifically, the top screen), so as to prompt multiple users to refrain from simultaneously using the sheet management system 100. With such a configuration, multiple users are allowed to perform sheet management, while an output of printed materials having undergone unintended print adjustments can be suppressed.

Furthermore, in this embodiment, the message display setting mode can be changed. Therefore, the operability desired by each user can he provided.

Second Embodiment

In a second embodiment, when simultaneous connections from a plurality of applications are detected, multiple connections can be prohibited by terminating an application or applications excluding one application. Moreover, in this embodiment, methods for setting connection sources that allow sheet management can be set in advance so as to cope with a plurality of use cases.

First Use Case

Figure 12:
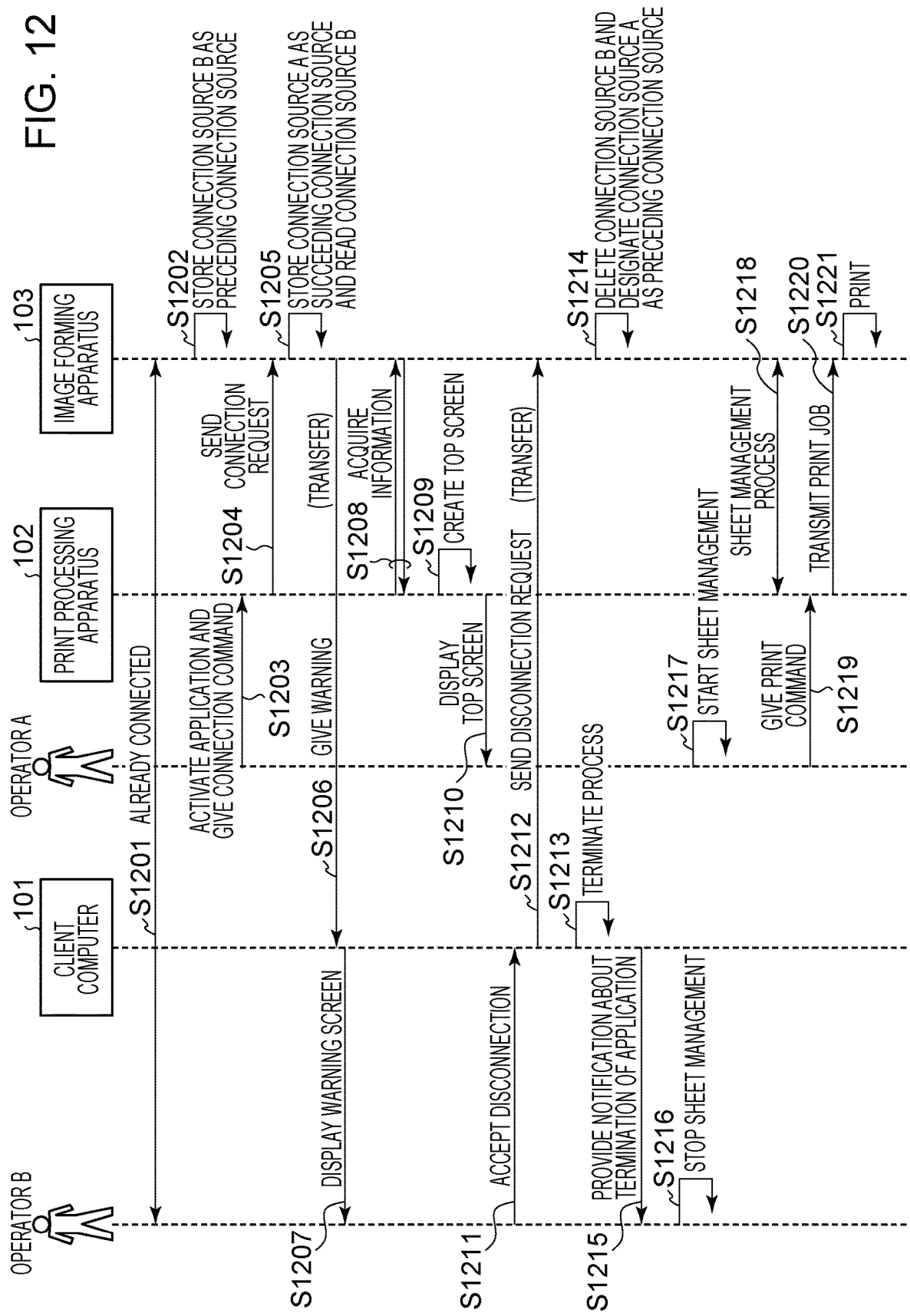
FIG. 12 illustrates the flow of a first use case according to a second embodiment.

In a case where there are multiple operators, there is a concept in that the operator who has started an operation later has a higher level of priority since the operation is the most-recent operation. The following description relates to a case where multiple connections are prohibited based on such a succeeding priority concept. FIG. 12 illustrates the flow of a first use case according to the second embodiment.

This use case will be described starting from a state where the client computer 101 and the image forming apparatus 103 are already connected to each other.

In step S1201, the operator B is performing sheet management, and the client computer 101 and the image forming apparatus 103 are already connected to each other. In this case, the image forming apparatus 103 stores the client computer 101 as a connection source B. In step S1202, the connection source B is managed as a preceding connection source. Specifically, as shown in FIG. 15A, the IP address 192.168.0.3 of the client computer 101 is stored as a first address in the connection-source management table.

Subsequently, the operator A activates the sheet management application in the print processing apparatus 102 to start performing sheet management. Then, the IP address of the print processing apparatus 102 is input so as to perform sheet management of the image forming apparatus 103 In step S1204, the print processing apparatus 102 transmits a connection request so as to register the connection source in the image forming apparatus 103. The connection request includes IP address information of the print processing apparatus 102. In step S1205, the image forming apparatus 103 registers the connection source A, which is the IP address of the source of the connection request, thereby completing the connection procedure. In this case, the connection source A is managed as a succeeding connection source. Specifically, as shown in FIG. 15B, the IP address 192.168.0.1 of the print processing apparatus 102 is stored as a second address in the connection-source management table.

Figure 17A:
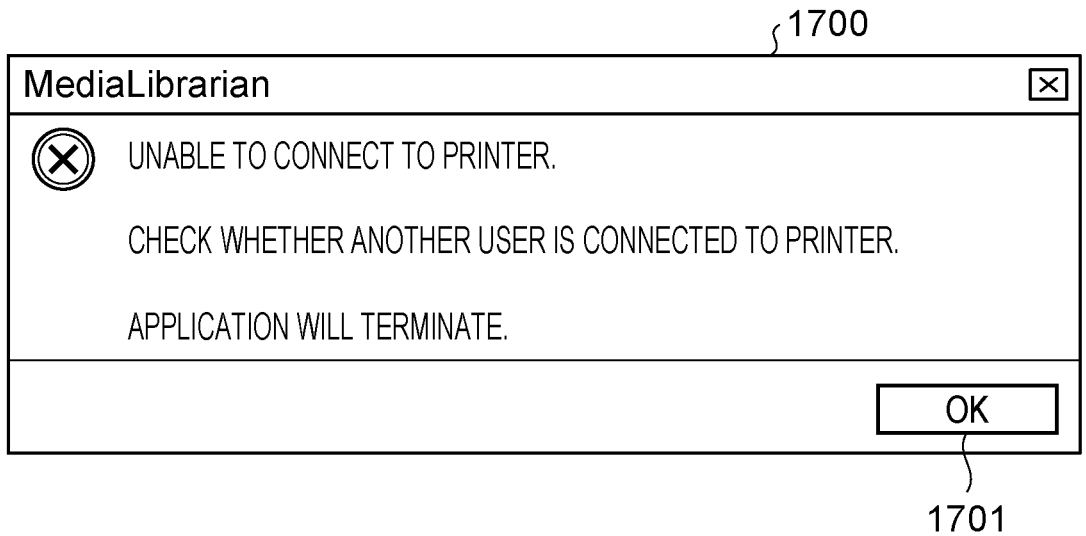
FIG. 17A illustrates a warning screen.

When there is a succeeding connection destination, the image forming apparatus 103 detects the occurrence of multiple connections. In step S1206, a warning is given to the connection source B serving as a preceding connection source. In step S1207, the client computer 101 having received the warning presents a warning screen to the operator B. FIG. 17A illustrates a warning screen 1700. A message indicating that multiple connections have occurred and that sheet management cannot be performed is disposed in the warning screen 1700. A confirm button 1701 for the message is also disposed. Selecting the confirm button 1701 implies that the termination of the application is confirmed and accepted. In other words, the warning screen 1700 functions as an application termination screen.

When the connection procedure is completed, the print processing apparatus 102 acquires, for example, sheet-feeder information and sheet information from the image forming apparatus 103 in step S1208. The print processing apparatus 102 creates a top screen based on the acquired information in step S1209 and presents the top screen to the operator A in step S1210.

In step S1211, the operator B not able to perform sheet management due to the warning screen accepts disconnection. When disconnection is accepted, the client computer 101 transmits a disconnection request to the image forming apparatus 103 in step S1212 and executes a process for terminating the sheet management application in step S1213. In step S1214, the image forming apparatus 103 receiving the disconnection request deletes the connection source B from the management table and updates the connection source A to a preceding connection source in step S1214. Specifically, as shown in FIG. 15C, the IP address 192.168.0.3 is deleted, and the IP address 192.168.0.1 is stored as the first address in the connection-source management table. In step S1215, the operator B is notified of the termination of the sheet management application.

Accordingly, the operator B stops the sheet management in step S1216, and the operator A becomes capable of starting the sheet management in step S1217. After the sheet management process is performed in step S1218, the operator A gives a print command by using, for example, the printer driver in step S1219. A job corresponding to the print command undergoes raster image processing in the print processing apparatus 102 and is transmitted to the image forming apparatus 103 in step S1220. In step S1221, the image forming apparatus 103 performs printing based on the print data.

Second Use Case

Figure 13:
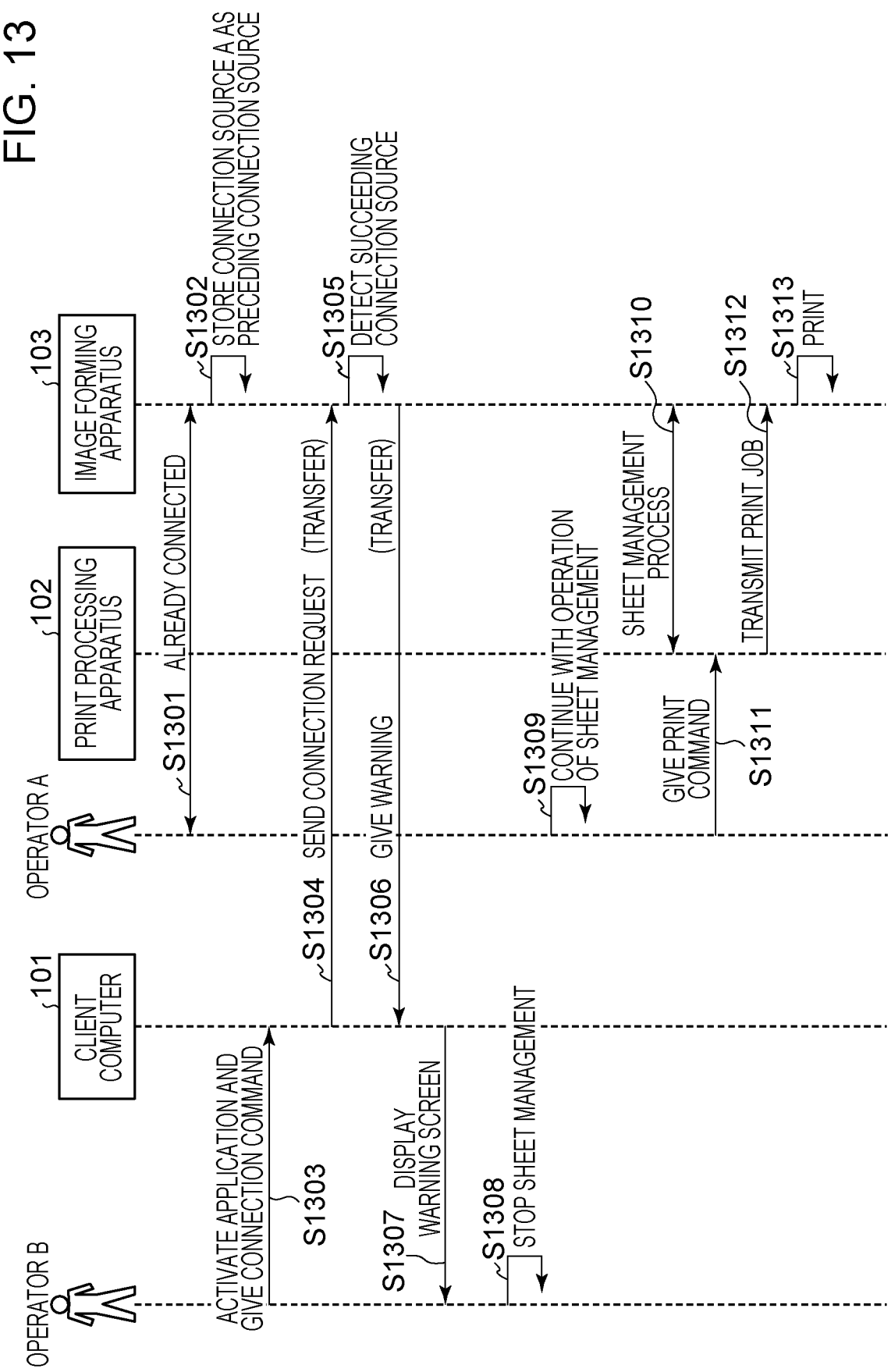
FIG. 13 illustrates the flow of a second use case according to the second embodiment.

In a case where there are multiple operators, there is a concept in that the operator who has started an operation first has a higher level of priority since the time it takes to start printing tends to be short. The following description relates to a case where multiple connections are prohibited based on such a preceding priority concept. FIG. 13 illustrates the flow of a second use case according to the second embodiment.

This use case will be described starting from a state where the print processing apparatus 102 and the image forming apparatus 103 are already connected to each other.

In step S1301, the operator A is performing sheet management, and the print processing apparatus 102 and the image forming apparatus 103 are already connected to each other. In this case, the image fanning apparatus 103 stores the print processing apparatus 102 as a connection source A. In step S1302, the connection source A is managed as a preceding connection source.

Subsequently, the operator B activates the sheet management application in the client computer 101 to start performing sheet management. Then, in order to perform sheet management of the image forming apparatus 103, the IP address of the print processing apparatus 102 is input in step S1303. In step S1304, the client computer 101 transmits a connection request to register the connection source in the image forming apparatus 103. The connection request includes IP address information of the client computer 101. In step S1305, the image forming apparatus 103 acquires the connection source B, which is the IP address of the source of the connection request, and then detects the occurrence of multiple connections. In step S1306, a warning is given to the connection source B serving as a succeeding connection source. In step S1307, the client computer 101 having received the warning presents a warning screen to the operator B, Accordingly, the operator B stops the sheet management in step S1308, and the operator A becomes capable of continuing with the sheet management in step S1309. After the sheet management process is performed in step S1310, the operator A gives a print command by using, for example, the printer driver in step S1311. A job corresponding to the print command undergoes raster image processing in the print processing apparatus 102 and is transmitted to the image forming apparatus 103 in step S1312. In step S1313, the image forming apparatus 103 performs printing based on the print data.

Third Use Case

Figure 14:
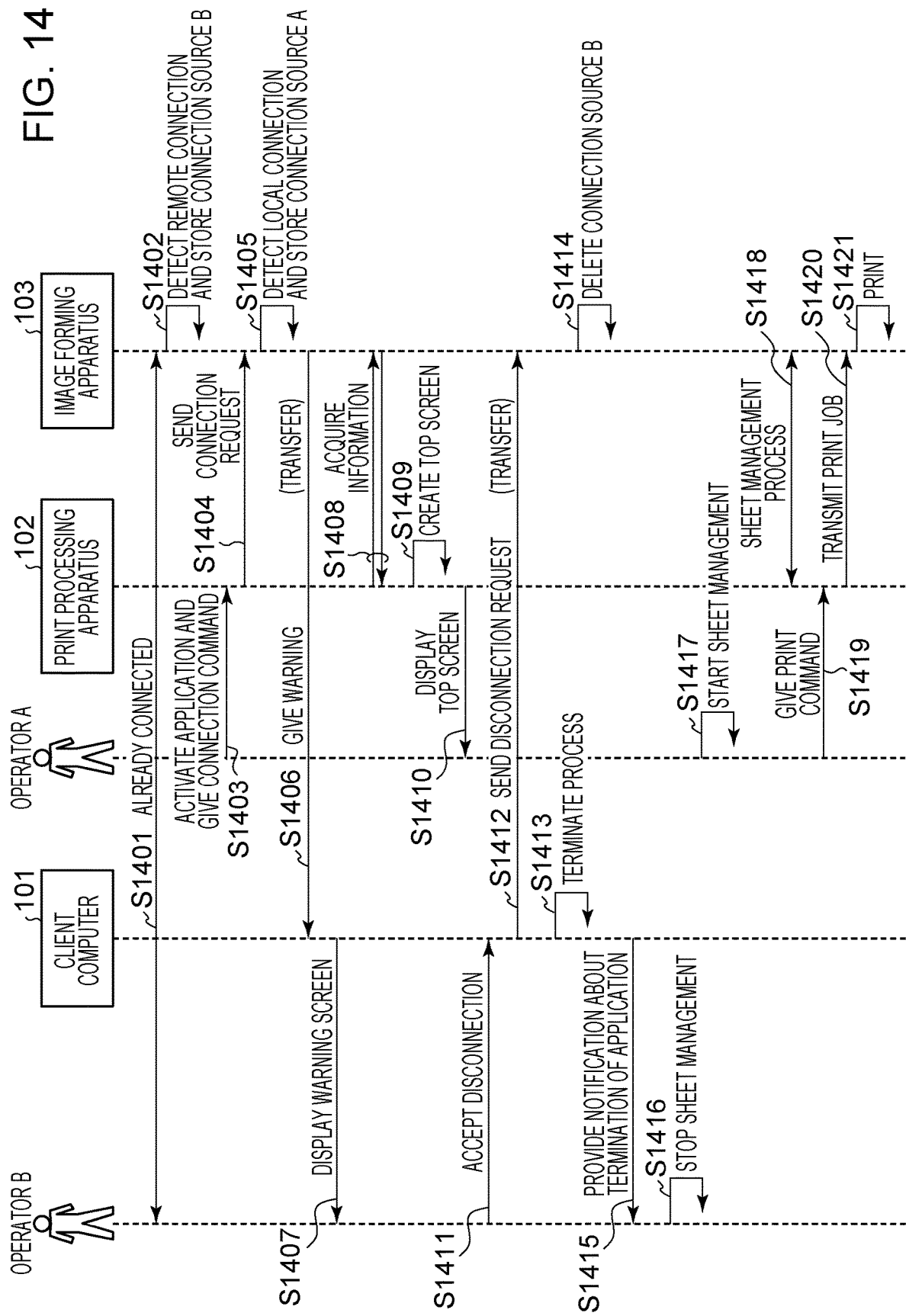
FIG. 14 illustrates the flow of a third use case according to the second embodiment.

In a case where there are multiple operators, there is a concept in that the operator operating from a specific connection source has higher authority and a higher level of priority. The following description relates to a case where multiple connections are prohibited based on such a designated-connection-source priority concept. FIG. 14 illustrates the flow of a third use case according to the second embodiment.

This use case will be described starting from a state where the client computer 101 and the image forming apparatus 103 are already connected to each other.

In step S1401, the operator B is performing sheet management, and the client computer 101 and the image forming apparatus 103 are already connected to each other. In this case, the image forming apparatus 103 stores the client computer 101 as a connection source B. In step S1402, the connection source B is managed as a remote connection source.

Subsequently, the operator A activates the sheet management application in the print processing apparatus 102 to start performing sheet management. Then, in order to perform sheet management of the image forming apparatus 103, the IP address of the print processing apparatus 102 is input in step S1403. The print processing apparatus 102 transmits a connection request in step S1404 to register the connection source in the image forming apparatus 103. The connection request includes IP address information of the print processing apparatus 102. In step S1405, the image forming apparatus 103 registers the connection source A, which is the IP address of the source of the connection request, thereby completing the connection procedure. In this case, the connection source A is managed as a local connection source.

When the connection source A is connected, the image forming apparatus 103 detects the occurrence of multiple connections. Then, in step S1406, a warning is given to the connection source B serving as a remote connection source. In step S1407, the client computer 101 receiving the warning presents a warning screen to the Operator B.

When the connection procedure is completed, the print processing apparatus 102 acquires, for example, sheet-feeder information and sheet information from the image forming apparatus 103 in step S1408. The print processing apparatus 102 creates a top screen based on the acquired information in step S1409 and presents the top screen to the operator A in step S1410.

In step S1411, the operator B not able to perform sheet management due to the warning screen accepts disconnection. When disconnection is accepted, the client computer 101 transmits a disconnection request to the image forming apparatus 103 in step S1412 and executes a process for terminating the sheet management application in step S1413. In step S1414, the image forming apparatus 103 receiving the disconnection request deletes the connection source B from the management table. In step S1415, the operator B is notified that the sheet management application has been terminated.

Accordingly, the operator B stops the sheet management in step S1416, and the operator A becomes capable of starting the sheet management in step S1417. After the sheet management process is performed in step S1418, the operator A gives a print command by using, for example, the printer driver in step S1419. A job corresponding to the print command undergoes raster image processing in the print processing apparatus 102 and is transmitted to the image forming apparatus 103 in step S1420. In step S1421, the image forming apparatus 103 performs printing based on the print data.

Setting Screen

Figure 17B:
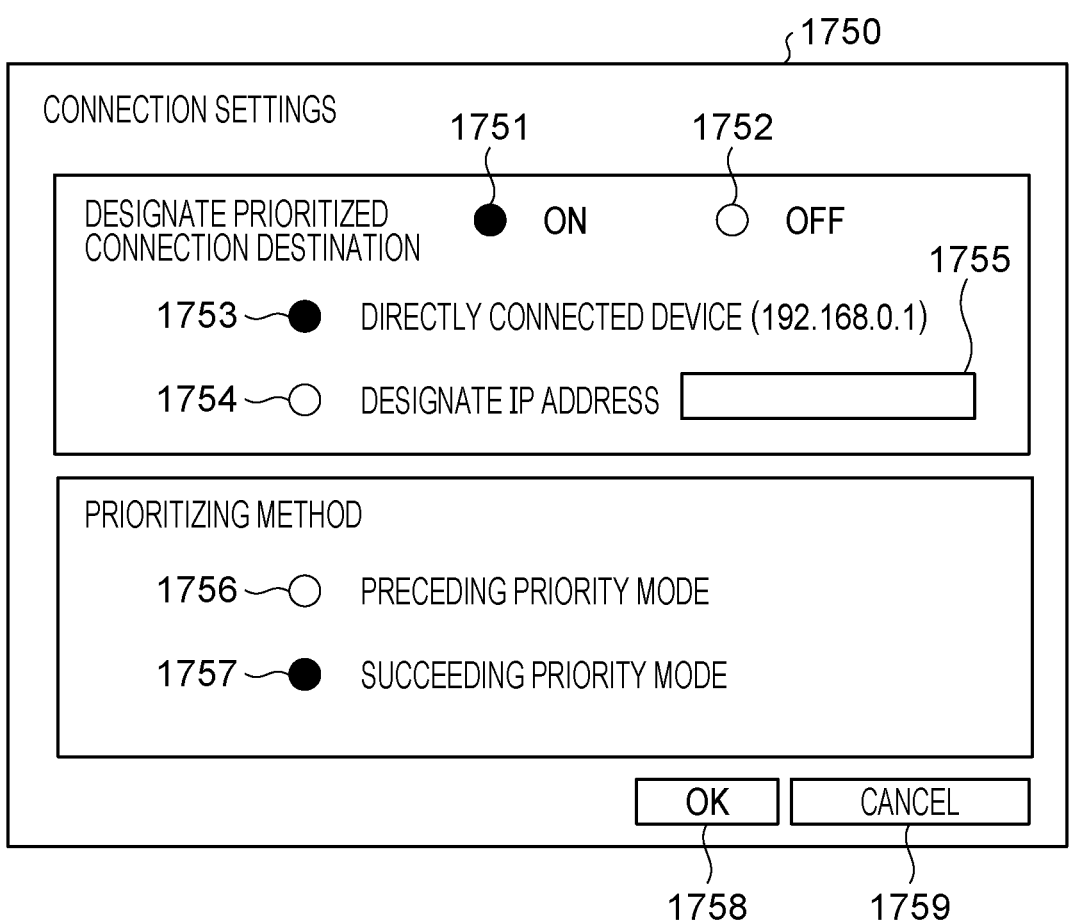
FIG. 17B illustrates a connection setting screen.

In order to cope with each of the use cases described above, a connection-source prioritizing method may be designated in this embodiment. The prioritizing method is designated on a connection setting screen. FIG. 17B illustrates the connection setting screen.

A setting screen 1750 is used for setting a method for managing the IP address of an apparatus that activates the sheet management application. By using the setting screen 1750, a prioritized connection destination can be designated, and the prioritizing method can be set.

When a button 1751 is selected, the mode for designating a prioritized connection destination is enabled. When a button 1752 is selected, the mode for designating a prioritized connection destination is disabled, if the mode for designating a prioritized connection destination is enabled, it is requested to designate a prioritized connection destination. When a button 1753 is checked, the IP address of the apparatus directly connected to the image forming apparatus 103 is automatically designated. In this case, the IP address 192.168.0.1 of the print processing apparatus 102 is designated. When a button 1754 is checked, a desired IP address can be input to an input form 1755 and can be designated.

The prioritizing method can be selected from two modes, namely, a preceding priority mode and a succeeding priority mode. When a button 1756 is checked, the preceding priority mode is designated. When a button 1757 is checked, the succeeding priority mode is designated.

The setting information input to the connection setting screen 1750 is managed by being stored in the nonvolatile memory 209 of the image forming apparatus 103.

If this priority setting process is to be performed from the image forming apparatus 103, the connection setting screen 1750 is displayed on the control panel 105. If this priority setting process is to be performed from the print processing apparatus 102, the connection setting screen 1750 is displayed on the display device 111. If this priority setting process is to be performed from the client computer 101, the connection setting screen 1750 is displayed on the display device 114.

Connection Process

Figure 16:
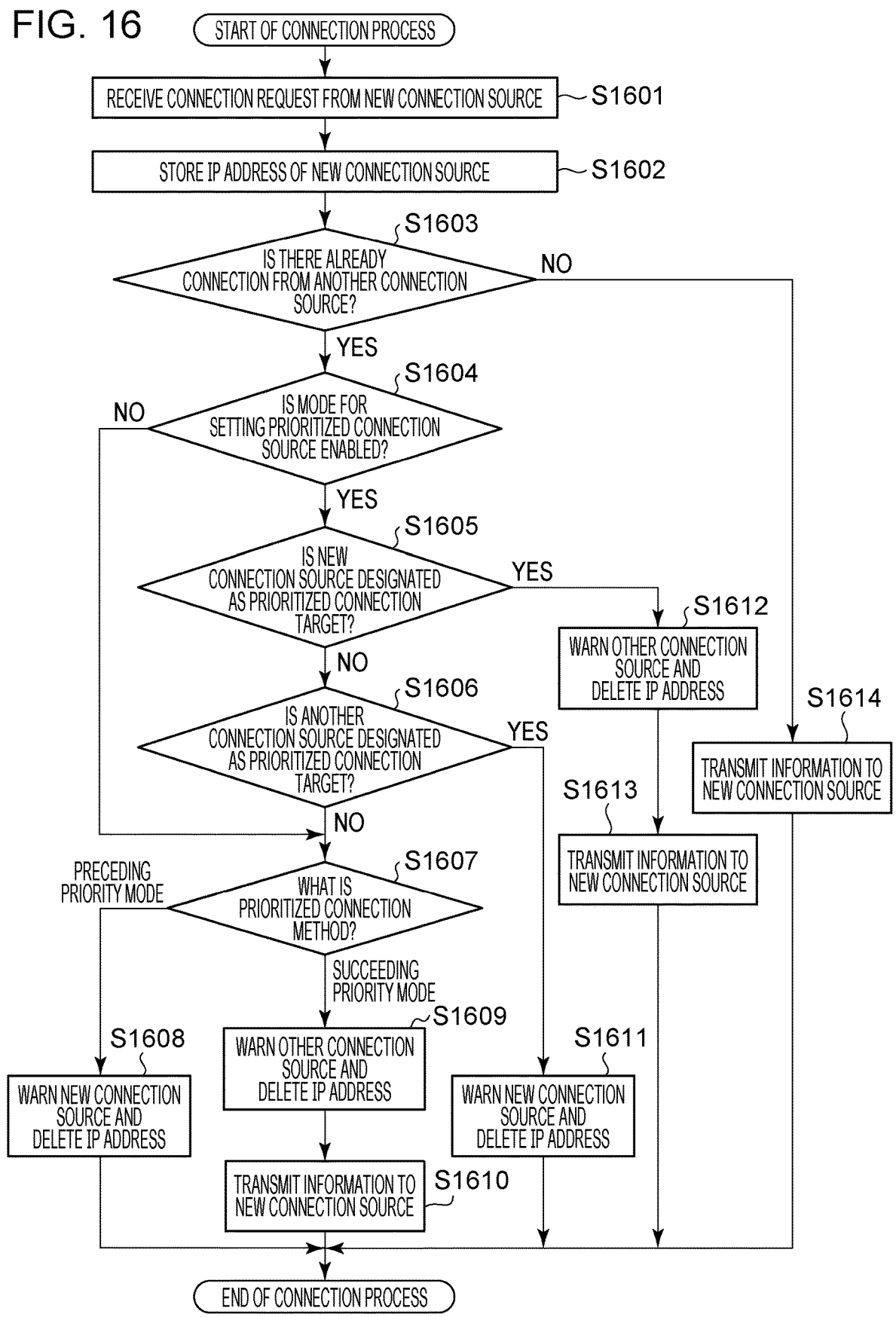
FIG. 16 illustrates the flow of a connection process.

In order to cope with each of the use cases described above, a connection management process is performed in accordance with the following flow in this embodiment. This program is executed by the controller 200 of the image forming apparatus 103. FIG. 16 illustrates the flow of a connection process.

In step S1601, the controller 200 receives a connection request from a new connection source. A new connection source is an apparatus that has started executing the sheet management application. In step S1602, the controller 200 stores the IP address of the new connection source. In step S1603, the controller 200 checks whether there is already a connection from another connection source. If there is already a connection (YES in step S1603), the process proceeds to step S1604. If there is no connection (NO in step S1603), the process proceeds to step S1614 where information necessary for displaying the screen of the sheet management application is transmitted to the new connection source.

In step S1604, the controller 200 checks whether or not the mode for setting a prioritized connection source is enabled. If the mode is enabled (YES in step S1604), the process proceeds to step S1605. If the mode is disabled, the process proceeds to step S1607.

In step S1605, the controller 200 determines whether or not the new connection source is designated as a prioritized connection target. If the new connection source is designated as a prioritized connection target (YES in step S1605), the process proceeds to step S1612. Then, a warning is given to another connection source, and the IP address of that connection source is deleted. In step S1613, information necessary for displaying the screen of the sheet management application is transmitted to the new connection source.

If the new connection source is not designated as a prioritized connection target (NO in step S1605), the process proceeds to step S1606 where it is determined whether or not another connection source is a prioritized connection target. If another connection source is a prioritized connection target (YES in step S1606), a warning is given to the new connection source, and the IP address of the new connection source is deleted in step S1611.

If another connection source is not a prioritized connection target (NO in step S1606), the process proceeds to step S1607.

In step S1607, the controller 200 determines what the set prioritizing method is. If the prioritizing method is the preceding priority mode (preceding priority mode in step S1607), a warning is given to the new connection source, and the IP address of the new connection source is deleted in step S1608. If the prioritizing method is the succeeding priority mode (succeeding priority mode in step S1607), a warning is given to another connection source, and the IP address of that connection source is deleted in step S1609. Then, in step S1610, information necessary for displaying the screen of the sheet management application is transmitted to the new connection source.

Remarks

In the first embodiment, even if an operator pays attention to conflicting operations, it is still difficult to completely eliminate a print output based on a print adjustment unintended by the operator caused by conflicting operations. In the second embodiment, the connection source that allows for a sheet management operation is constantly kept to a single source, so that the above problem can be eliminated.

In this embodiment, the sheet management application can be executed in the preceding priority mode. Therefore, the operation of the user executing the sheet management application first is not interrupted.

In this embodiment, the sheet management application can be executed in the succeeding priority mode. Therefore, a sheet management environment can be provided to a user who desires to start performing the sheet management immediately.

In this embodiment, an operator can freely designate the IP address of a prioritized connection destination, so that the embodiment can be applied to various usage environments.

In this embodiment, a local connection can be prioritized over a remote connection. Therefore, the image forming apparatus 103 is located nearby, so that resupplying of sheets to a sheet feeder is possible, whereby the printing environment can be organized and an operator who is highly possible of commanding printing immediately can be prioritized.

The connection-destination prioritizing method is not limited to that described above. For example, it is conceivable that setting the priority levels for connection depending on the roles of operators may be better in terms of the convenience for the operators. For example, it is conceivable that an operation performable in an application may be restricted depending on whether or not an operator is a system administrator. It is assumed that a system administrator is capable of performing all operations, whereas a normal operator is only allowed to register a sheet in a sheet feeder. If simultaneous connections by a system administrator and a normal operator are detected, the connection with the system administrator who may possibly be performing an operation that may be troublesome if interrupted, such as a sheet setting changing process, may be prioritized.

Third Embodiment

This embodiment relates to a case where multiple connections are permitted, but if an operation during the multiple connections is related to a print adjustment, the operation is restricted. This embodiment is similar to the first embodiment in that an IP address is managed in the flow shown in FIG. 11B.

Use Case

FIG. 18 illustrates a use case according to the third embodiment. This use case will be described starting from a state where the print processing apparatus 102 and the image forming apparatus 103 are already connected to each other.

In step S1801, the operator A is performing sheet management, and the print processing apparatus 102 and the image forming apparatus 103 are already connected to each other. In this case, the image forming apparatus 103 stores the print processing apparatus 102 as a connection source A in step S1802. In this state, the operator A gives a change command(i.e. update command) for changing a print-adjustment-related item in step S1803. For example, the operator A opens the secondary-transfer-voltage adjustment screen 890, changes an adjustment value, and presses the OK button 892. When the user command is received, the controller 300 detects in step S1804 that the command is for restricting operations. Then, in order to check for a simultaneously-connected state, the controller 300 sends an inquiry to the image forming apparatus 103 and confirms that the state is not a simultaneously-connected state in step S1805. Because the state is not a simultaneously-connected state, the print processing apparatus 102 transmits the setting value corresponding to the received change command to the image forming apparatus 103 in step S1806. The image forming apparatus 103 that has received the update setting value (i.e. update request for the setting value) updates the setting value in step S1807. Then, the updated information is transmitted to the print processing apparatus 102 in step S1808. When the adjustment-value changing process is completed, the print processing apparatus 102 presents the top screen to the operator A in step S1809.

Subsequently, the operator B activates the sheet management application in the client computer 101 to start performing sheet management. Then, in order to perform sheet management of the image forming apparatus 103, the IP address of the print processing apparatus 102 is input in step S1810. In step S1811, the client computer 101 transmits a connection request to register the connection source in the image forming apparatus 103. The connection request has a meaning of providing a notification about the start of the sheet management application. The connection request includes IP address information of the client computer 101. In step S1812, the image forming apparatus 103 stores the connection source B, which is the IP address of the source of the connection request.

In step S1813, the client computer 101 acquires, for example, sheet-feeder information and sheet information from the image forming apparatus 103. The client computer 101 creates a top screen based on the acquired information in step S1814 and presents the top screen to the operator B in step S1815.

In step S1816, the operator B performs an operation for sheet management. In step S1817, the operator B gives a change command for changing a print-adjustment-related item. When the user command is received, the controller 400 detects in step S1818 that the command is for a restricted operation. Then, in order to check for a simultaneously-connected state, the controller 400 sends an inquiry to the image forming apparatus 103 and confirms that the state is a simultaneously-connected state in step S1819. Because the state is a simultaneously-connected state, the update setting value is not transmitted and is stopped in step S1820, unlike the case of the operator A. Then, in step S1821, the client computer 101 provides a notification to the operator B by using a warning screen indicating that the current environment is an environment in which operations are restricted.

In the simultaneously-connected state, the operator A and the operator B are capable of performing operations within limitations (steps S1822 and S1823). Specifically, a non-print-adjustment-related operation, such as checking a setting value, can be performed. In this state, the operator A checks the contents of the adjustment corresponding to the command in step S1803 and gives a print command via, for example, the printer driver in step S1824. A job corresponding to the print command undergoes raster image processing in the print processing apparatus 102 and is transmitted to the image forming apparatus 103 in step S1825. In step S1826, the image forming apparatus 103 performs printing based on the print data.

Operation Restriction Process

Figure 19A:
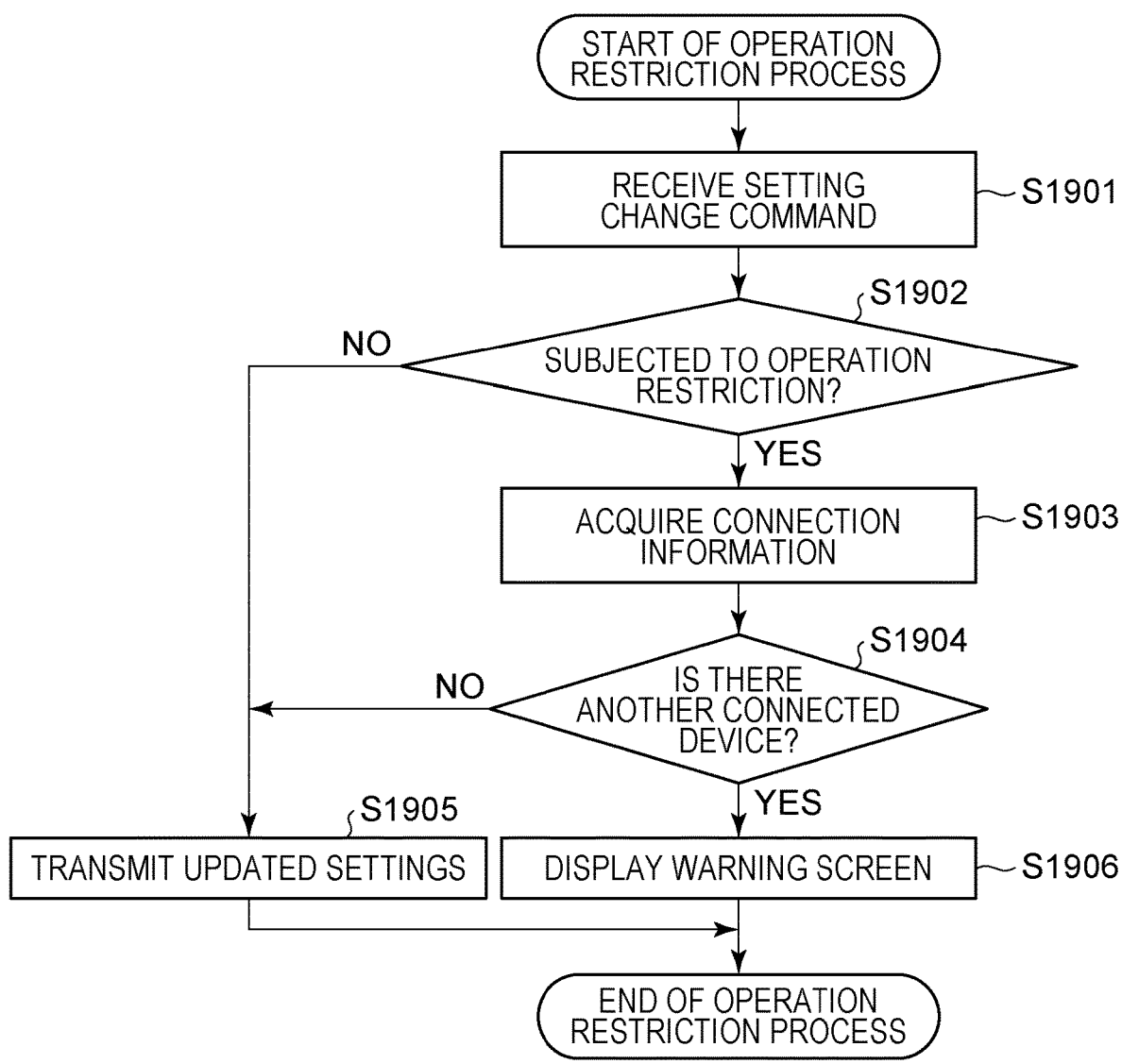
FIG. 19A illustrates the flow of an operation restriction process.
Figures 19B, 19C:
FIG. 19B illustrates an operation restriction table.
FIG. 19C illustrates a warning screen.

In order to cope with the use case described above, a program shown in the flow in FIG. 19A and table information shown in FIG. 19B are used. FIG. 19A illustrates the flow of an operation restriction process. FIG. 19B illustrates an operation restriction table. The aforementioned program is executed by the print processing apparatus 102 or the client computer 101. Alternatively, this process may partially or entirely be executed by the image forming apparatus 103.

In step S1901, a controller (e.g. the controller 300) executing the sheet management application receives a setting change command from a user. When the setting change command is received, the controller 300 determines in step S1902 whether or not the command is for restricting operations. In this determination, an operation restriction table 1910 as shown in FIG. 19B is used. In the operation restriction table 1910, it is assumed that operation type IDs corresponding to operations are defined in advance. The controller 300 refers to the operation restriction table 1910 in FIG. 19B to acquire information indicating whether or not the operation type II) corresponding to the current operation is restricted. For example, in a case where an operation for changing the sheet settings is performed, the controller 300 refers to the operation restriction table 1910 using an operation type ID of 2 as a key, so as to acquire information indicating that there is a restriction. If information indicating that there is a restriction is acquired, the controller 300 causes the process to proceed to step S1903. If information indicating that there is no restriction is acquired, the controller 300 causes the process to proceed to step S1905 to transmit an update setting value to the image forming apparatus 103. The process then ends.

In step S1903, the controller 300 causes the operation restriction unit 356 to acquire, from the image forming apparatus 103, the number of applications currently connected to an apparatus other than itself. The information to be acquired may be another type of information so long as it is determinable whether or not simultaneous connections are being performed with respect to the image forming apparatus 103. The controller 200 causes the connection management unit 252 to refer to a connection management table (e.g. a connection management table 1510 in FIG. 15A), and notifies the print processing apparatus 102 of the number of registered IP addresses excluding the IP address of the request source.

In step S1904, the controller 300 causes the operation restriction unit 356 to determine whether there is an application currently connected to the image forming apparatus 103 other than itself In detail, the controller 300 determines whether the number of connections acquired in step S1903 is one or more so as to determine whether there is an application currently connected to the image forming apparatus 103 other than that being executed by the controller 300 itself. The controller 300 causes the process to proceed to step S1906 if there is an application currently connected to the image forming apparatus 103 other than that being executed by the controller 300 itself. The controller 300 causes the process to proceed to step S1905 if there is no application currently connected to the image forming apparatus 103 other than itself.

In step S1906, the controller 300 presents a warning screen to the operator A. FIG. 19C illustrates a warning screen 1920. The warning screen 1920 includes a message "Unable to change setting value related to print adjustment due to multiple connections" to the image forming apparatus 103, and a message "Other operations are allowed".

When the warning screen is displayed, the controller 300 terminates the process.

If there is no other application currently connected to the image forming apparatus 103, the controller 300 causes the process to proceed to step S1905 to transmit an update setting value to the image forming apparatus 103. The process then ends.

Remarks

The description of the second embodiment above relates to a case where multiple connections are prohibited. Since multiple connections are prohibited even when an operator tries to perform an operation not related to a print adjustment, there is a concern in terms of lower operability of the operator. In contrast, in this embodiment, only operations for print adjustment-related items are restricted during multiple connections, so that excellent operability can be provided to the users, while an output of printed materials having undergone unintended print adjustments can be suppressed.

The contents of an operation and the information indicating whether or not there is a restriction are defined as in the operation restriction table 1910 in this embodiment, but may be defined using another method in accordance with the apparatus configuration or the usage environment.

Fourth Embodiment

This embodiment relates to a case where an operator performing an operation is notified of a result of a setting changing process performed by another operator so that an output of printed materials having undergone unintended print adjustments can be suppressed. Specifically, in this embodiment, multiple connections are permitted, and a notification about a result of a setting changing process performed by another operator can be provided.

Use Case

FIG. 20 illustrates the flow of a use case according to the fourth embodiment. This use case will be described starting from a state where the print processing apparatus 102 and the image forming apparatus 103 are already connected to each other.

In step S2001, the operator A is performing sheet management, and the print processing apparatus 102 and the image forming apparatus 103 are already connected to each other. In this case, the image forming apparatus 103 stores the print processing apparatus 102 as a connection source A in step S2002. In this state, the operator A starts performing a sheet management operation in step S2003. In step S2004, the operator A gives a change command for changing a print-adjustment-related item. For example, the operator A opens the secondary-transfer-voltage adjustment screen 890, changes an adjustment value, and presses the OK button 892. When the user command is received, the controller 300 transmits an update setting value to the image forming apparatus 103 in step S2005. In step S2007, the image forming apparatus 103 that has received the update setting value updates the setting value. Moreover, in step S2006, the controller 300 determines whether or not the update is subjected to notification. In this case, the controller 300 determines that the update is subjected to notification. Then, in order to check for a simultaneously-connected state, the controller 300 sends an inquiry to the image forming apparatus 103 and confirms that the state is not a simultaneously-connected state in step S2008. Because the state is not a simultaneously-connected state, the adjustment screen is closed, and the adjustment-value changing process ends in step S2009.

Subsequently, the operator B activates the sheet management application in the client computer 101 to start performing sheet management. Then, in order to perform sheet management of the image forming apparatus 103, the IP address of the print processing apparatus 102 is input in step S2010. In step S2011, the client computer 101 transmits a connection request to register the connection source in the image forming apparatus 103. The connection request includes IP address information of the client computer 101. The image forming apparatus 103 stores the connection source B, which is the IP address of the source of the connection request, in step S2012.

In step S2013, the client computer 101 acquires, for example, sheet-feeder information and sheet information from the image forming apparatus 103. The client computer 101 creates a top screen based on the acquired information in step S2014 and presents the top screen to the operator B in step S2015.

Figures 21A, 21B, 21C:
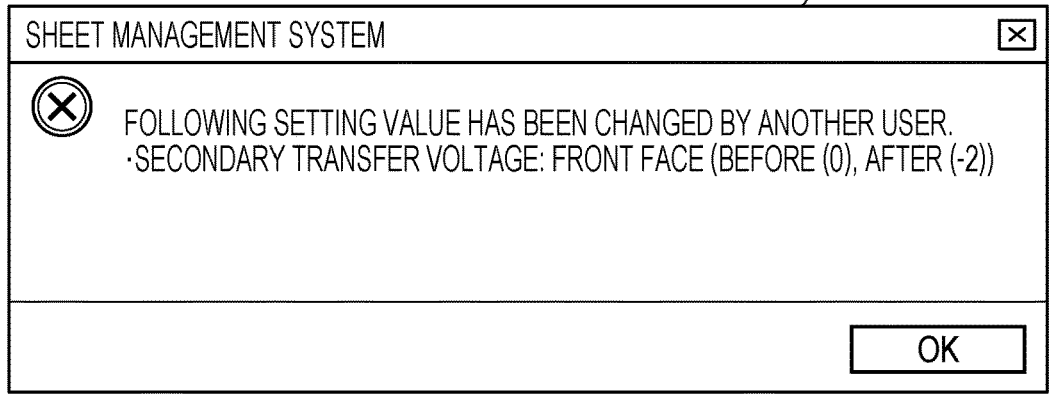
FIG. 21A illustrates a notification screen.
FIG. 21B illustrates a message ID table.
FIG. 21C illustrates an adjustment-value ID table.

In step S2016, the operator B performs an operation for sheet management. In step S2017, the operator B gives a change command for changing a print-adjustment-related item. When the user command is received, the controller 400 transmits an update setting value to the image forming apparatus 103 in step S2018. In step S2020, the image forming apparatus 103 that has received the update setting value updates the setting value. Moreover, in step S2019, the controller 400 determines whether or not the update is subjected to notification. In this case, the controller 400 determines that the update is subjected to notification. Then, in order to check for a simultaneously-connected state, the controller 400 sends an inquiry to the image forming apparatus 103 and confirms that the state is a simultaneously-connected state in step S2021. Because the state is a simultaneously-connected state, the controller 400 makes a change notification request to the image forming apparatus 103 in step S2022. The controller 200 that has received the change notification request from the connection source B extracts a connection source other than the connection source B in step S2023, and provides a notification about the requested contents in the change notification request in step S2024. The controller 300 that has received the notification generates a change notification screen and presents it to the operator in step S2025. For example, the change notification screen is as shown in FIG. 21A. FIG. 21A illustrates a notification screen 2110. The notification screen 2110 is a screen for notifying the operator that the settings have been changed. The notification screen 2110 includes a message indicating that the settings have been changed by an operation performed by another operator, information about a changed setting value, and an OK button for closing the screen.

When the operator A confirms the notification and selects the OK button in step S2026, the notification screen 2110 is closed in step S2027.

Subsequently, the operator A and the operator B are capable of continuing with the sheet management operation in step S2028 and step S2029. After an adjustment value is changed again, where necessary, in step S2030, the operator A gives a print command by using, for example, the printer driver in step S2031. A job corresponding to the print command undergoes raster image processing in the print processing apparatus 102 and is transmitted to the image forming apparatus 103 in step S2032. In step S2033, the image forming apparatus 103 performs printing based on the print data.

Operation Restriction Process

In order to cope with the use case described above, a program shown in the flow in FIG. 22 and table information shown in FIGS. 21B and 21C are used. FIG. 21B illustrates a message II) table, FIG. 21C illustrates an adjustment-value ID table.

Figure 22:
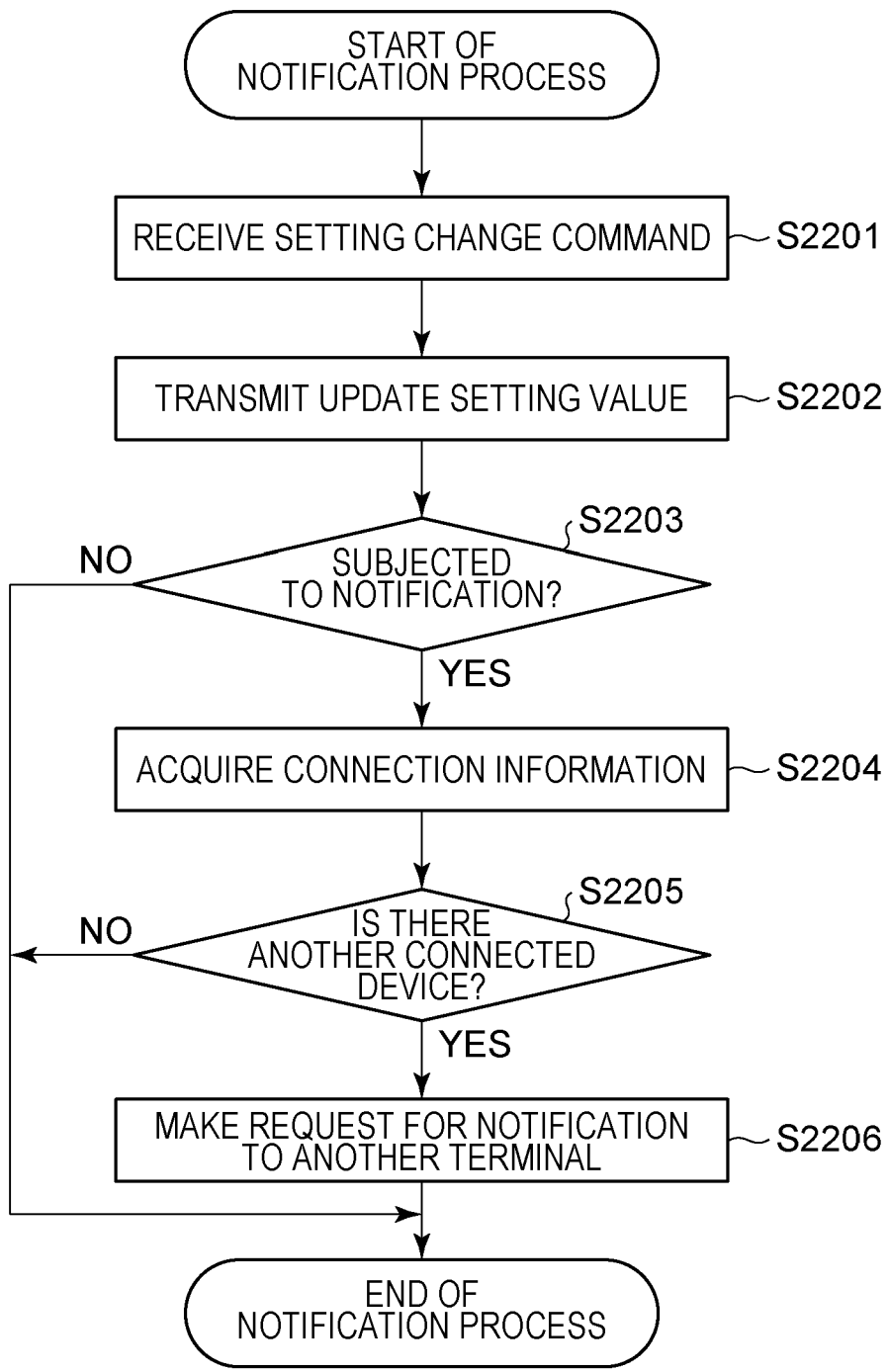
FIG. 22 illustrates the flow of a notification process.

FIG. 22 illustrates the flow of a notification process. The aforementioned program is executed by the print processing apparatus 102 or the client computer 101. Alternatively, this process may partially or entirely be executed by the image forming apparatus 103.

In step S2201, a controller (e.g. the controller 300) executing the sheet management application receives a setting change command from a user. When the setting change command is received, the controller 300 transmits an update setting value to the image forming apparatus 103 in step S2202. In this case, the controller 300 preliminarily stores difference information between a non-updated setting value and an updated setting value. In step S2203, the controller 300 determines whether or not the transmitted update setting value is subjected to notification. In this determination, the table as shown in FIG. 19B is used. Specifically, in contrast to FIG. 19B in which information indicating whether or not operations are restricted is managed, a notification table in which this information is replaced with information indicating whether or not notifications are provided is used. In this notification table, it is assumed that operation type IDs corresponding to operations are defined in advance. The controller 300 refers to the notification table to acquire information indicating whether or not a notification about the operation type ID corresponding to the current operation is to be provided. For example, in a case where an operation for changing the sheet settings is performed, the controller 300 refers to the notification table using an operation type ID of 2 as a key, so as to acquire information indicating that there is a restriction. It is determined that no notification is to be provided, the controller 300 terminates the process. If it is determined that a notification is to be provided, the controller 300 causes the process to proceed to step S2204.

In step S2204, the controller 300 causes the operation restriction unit 356 to acquire, from the image forming apparatus 103, the number of applications currently connected to the apparatus other than itself. The information to he acquired may be another type of information so long as it is determinable whether or not simultaneous connections are being performed with respect to the image forming apparatus 103. The controller 200 causes the connection management unit 252 to refer to the connection management table, and notifies the print processing apparatus 102 of the number of registered IP addresses excluding the IP address of the request source.

In step S2205, the controller 300 causes the operation restriction unit 356 to determine whether there is an application currently connected to the image forming apparatus 103 other than itself. In detail, the controller 300 determines whether the number of connections acquired in step S2204 is one or more so as to determine whether there is an application connected to the image forming apparatus 103 other than itself. The controller 300 causes the process to proceed to step S2206 if there is an application connected to the image forming apparatus 103 other than itself. The controller 300 terminates the process if there is no application connected to the image forming apparatus 103 other than itself.

In step S2206, the controller 300 creates message information according to the changed contents, and transmits a notification request including the message information to the image forming apparatus 103. The controller 300 creates the message information based on the difference information stored in step S2203. The message information at least includes message Ms defined in a message management table 2120 in FIG. 21B, adjustment type IDs defined in an adjustment-item management table 2130 in FIG. 21C, unchanged and changed setting values, sheet feeder IDs, and sheet IDs. Information required as the message information may vary from message ID to message ID in advance. After the message information is created, the controller 300 transmits a change notification request to the image forming apparatus 103.

As described above, in this embodiment, multiple connections are permitted, and a notification about a result of a setting changing process performed by-another operator can be provided. Accordingly, the contents of the settings changed by another operator can be recognized, while user-friendliness for each operator according to multiple connections is maintained. Therefore, an output of a printed material having undergone a print adjustment unintended by an operator caused by conflicting operations can be suppressed. Although the above description relates to the controller 300 of the print processing apparatus 102 as an example, a similar process is performed in a case where the process is performed by the controller 400 of the client computer 101.

Other Embodiments

The present invention is also realizable by performing a process involving supplying the program that realizes at least one function of any one of the above embodiments to a system or an apparatus via a network or a storage medium, and causing at least one processor in a computer of the system or the apparatus to read and execute the program. Moreover, the present invention is also realizable by a circuit that realizes at least one function e.g. an application-specific integrated circuit (ASIC)).

Furthermore, the present invention may be applied to a system constituted of a plurality of devices, or may be applied to an apparatus constituted of a single device. For example, the functions may be realized by causing an external server to partially execute a module described in software 350 and acquiring the result processed in the external server. For example, a job storage unit that stores print data may be provided in the external server.

The present invention is not limited to the above embodiments. Various modifications (including an organic combination of the embodiments) are possible based on the scope of the invention and are not to be excluded from the scope of the invention. Specifically, all configurations obtained by combining the above embodiments and the modifications thereof are included in the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. It will of course be understood that this invention has been described above by way of example only, and that modifications of detail can be made within the scope of this invention.

This application claims the benefit of Japanese Patent Application No. 2018-140395, filed Jul. 26, 2018, which is hereby incorporated by reference herein in its entirety.

What is claimed is:
1. A printing system comprising:
a plurality of external apparatuses, including a first external apparatus having a display configured to display information and including a second external apparatus, configured to execute a plurality of sheet management applications; and
a printing apparatus provided with a plurality of sheet containers and configured to (i) register sheet information in correspondence with the plurality of sheet containers and (ii) to update print adjustment information linked with the registered sheet information in accordance with a request from one of the plurality of sheet management applications, wherein the printing apparatus includes a printing apparatus controller having a processor and a memory configured to perform operations including:

retaining information corresponding to the first external apparatus executing a first sheet management application, and providing a first notification to the first external apparatus in a case where a second notification for starting a second sheet management application is acquired from the second external apparatus in a state where the information corresponding to the first external apparatus is retained, wherein the first external apparatus includes a first external apparatus controller having a processor and a memory configured to perform operations including:

causing the display to display a first screen of the first sheet management application, wherein the first screen is capable of listing the registered sheet information, and causing the display to display a second screen of the first sheet management application upon acquisition of the first notification from the printing apparatus, wherein the first screen includes a first message indicating that two or more sheet management applications should not be executed simultaneously, and wherein the second screen includes a second message related to a process of prohibiting the plurality of external apparatuses from simultaneously executing the two or more sheet management applications.

2. The printing system according to claim 1, wherein the registered sheet information is a sheet name.

3. The printing system according to claim 1,
wherein the first screen does not include specific print adjustment information, and
wherein the specific print adjustment information is information that includes at least one of the following: an image-quality-related adjustment item, an image-position-related adjustment item, or a sheet-conveyance-related adjustment item.

4. The printing system according to claim 1, wherein the second screen is a screen configured to prompt a user to terminate the first sheet management application.

5. The printing system according to claim 1, wherein the second screen is a screen for a user to terminate a sheet management application.

6. The printing system according to claim 1, wherein one of the first external apparatus and the second external apparatus is an external apparatus whose Internet Protocol (IP) address is preregistered.

7. The printing system according to claim 1, wherein the second message includes a message indicating that the first external apparatus is not connected to the printing apparatus.

8. The printing system according to claim 1, wherein the second message includes a message indicating that the printing apparatus is accessed by another user.

9. The printing system according to claim 1, wherein, in response to designation of a confirmation button arranged in the second screen, the first external apparatus controller performs the process of prohibiting the plurality of external apparatuses from simultaneously executing the two or more sheet management applications.

10. The printing system according to claim 9, wherein the process is a process of terminating one sheet management application that was executed first among the two or more sheet management applications.

11. The printing system according to claim 9, wherein the process is a process of terminating one sheet management application designated as a priority application and executed by one external apparatus.

12. An information processing apparatus in a printing system among a plurality of apparatuses configured to execute a plurality of sheet management applications communicable with a printing apparatus, wherein the information processing apparatus is configured to execute a sheet management application and is capable of requesting the printing apparatus to update print adjustment information linked with sheet information registered in the printing apparatus in correspondence with a plurality of sheet containers of the printing apparatus, the information processing apparatus comprising:

a display configured to display information; and
a controller having a processor and a memory configured to perform operations including:
causing the display to display a first screen of the sheet management application, wherein the first screen is capable of listing the registered sheet information, and
causing the display to display a second screen of the first sheet management application upon acquisition of a notification from the printing apparatus;
wherein the first screen includes a first message indicating that two or more sheet management applications should not be executed simultaneously, and
wherein the second screen includes a second message related to a process of prohibiting the plurality of apparatuses from simultaneously executing the two or more sheet management applications.

13. A non-transitory computer-readable storage medium storing a program to cause a computer to execute a method for an information processing apparatus in a printing system among a plurality of apparatuses configured to execute a plurality of sheet management applications communicable with a printing apparatus, wherein the information processing apparatus includes a display configured to display information and is configured to execute a sheet management application and is capable of requesting the printing apparatus to update print adjustment information linked with sheet information registered in the printing apparatus in correspondence with a plurality of sheet containers of the printing apparatus, the method comprising:

causing the display to display a first screen of the sheet management application, wherein the first screen is capable of listing the registered sheet information; and
causing the display to display a second screen of the first sheet management application upon acquisition of a notification from the printing apparatus;
wherein the first screen includes a first message indicating that two or more sheet management applications should not be executed simultaneously, and
wherein the second screen includes a second message related to a process of prohibiting the plurality of apparatuses from simultaneously executing the two or more sheet management applications.

* * * * *